(12) United States Patent
Fujiwara

(10) Patent No.: US 9,533,605 B2
(45) Date of Patent: Jan. 3, 2017

(54) VEHICLE SIDE AIRBAG DEVICE AND VEHICLE SEAT

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/428,414

(22) PCT Filed: Jul. 30, 2014

(86) PCT No.: PCT/JP2014/070132
§ 371 (c)(1),
(2) Date: Mar. 16, 2015

(87) PCT Pub. No.: WO2015/045613
PCT Pub. Date: Apr. 2, 2015

(65) Prior Publication Data
US 2016/0200280 A1    Jul. 14, 2016

(30) Foreign Application Priority Data
Sep. 27, 2013  (JP) ................................ 2013-202261

(51) Int. Cl.
*B60R 21/231*    (2011.01)
*B60N 2/42*    (2006.01)
(Continued)

(52) U.S. Cl.
CPC ............... *B60N 2/42* (2013.01); *B60N 2/4235* (2013.01); *B60N 2/4279* (2013.01);
(Continued)

(58) Field of Classification Search
CPC .......... B60R 2021/23324; B60R 2021/23316; B60R 2021/23146; B60R 21/26; B60R 21/2346; B60R 21/233; B60R 21/23138
See application file for complete search history.

(56) References Cited

U.S. PATENT DOCUMENTS 5,586,782 A * 12/1996 Zimmerman, II ............... B60R 21/23138
280/730.2
8,186,708 B2 * 5/2012 Zhou ................ B60R 21/16
280/730.2
(Continued)

FOREIGN PATENT DOCUMENTS

JP    2012-025182 A    2/2012
JP    2014-031051 A    2/2014
(Continued)

*Primary Examiner* — James English
(74) *Attorney, Agent, or Firm* — Oliff PLC

(57) ABSTRACT

In a vehicle side airbag device, when inflator operates, gas is supplied to left and right chambers of rear bag portion, and gas is supplied from communication opening through between a left and right side partitioning portions directly into a front bag portion. When inflation and expansion of the chambers are completed, the left and ride side partitioning portions are pushed against one another by internal pressures of the chambers, and the communication opening is closed-off. A valley, that is recessed toward a vehicle rear side, is formed at a front surface of the rear bag portion. At a time when the rear bag portion interferes with a vehicle occupant who is at an improper position, this valley is expanded due to the left and right chambers moving apart from one another in a vehicle left-right direction.

12 Claims, 13 Drawing Sheets

(51) Int. Cl.
  *B60R 21/207* (2006.01)
  *B60R 21/239* (2006.01)
  *B60R 21/264* (2006.01)
  *B60R 21/2346* (2011.01)
  *B60N 2/427* (2006.01)
  *B60R 21/00* (2006.01)
  *B60R 21/233* (2006.01)
  *B60R 21/26* (2011.01)

(52) U.S. Cl.
  CPC .......... *B60R 21/207* (2013.01); *B60R 21/233* (2013.01); *B60R 21/239* (2013.01); *B60R 21/2346* (2013.01); *B60R 21/23138* (2013.01); *B60R 21/264* (2013.01); *B60R 2021/0006* (2013.01); *B60R 2021/0032* (2013.01); *B60R 2021/23107* (2013.01); *B60R 2021/23146* (2013.01); *B60R 2021/23308* (2013.01); *B60R 2021/23324* (2013.01); *B60R 2021/26094* (2013.01)

(56) References Cited

U.S. PATENT DOCUMENTS

| | | | | |
|---|---|---|---|---|
| 2007/0267853 | A1* | 11/2007 | Kato | B60R 21/207 280/730.2 |
| 2012/0056410 | A1* | 3/2012 | Yamamoto | B60R 21/23138 280/730.2 |
| 2012/0126518 | A1* | 5/2012 | Fukawatase | B60R 21/207 280/730.2 |
| 2013/0033022 | A1* | 2/2013 | Yamamoto | B60R 21/231 280/730.2 |
| 2014/0159354 | A1* | 6/2014 | Fujiwara | B60R 21/23138 280/730.2 |
| 2015/0035262 | A1* | 2/2015 | Fukushima | B60R 21/233 280/729 |
| 2015/0197212 | A1* | 7/2015 | Fujiwara | B60R 21/233 280/729 |
| 2015/0239423 | A1* | 8/2015 | Hayashi | B60R 21/231 280/729 |
| 2015/0246656 | A1* | 9/2015 | Fujiwara | B60R 21/2346 280/730.2 |
| 2016/0114757 | A1* | 4/2016 | Fujiwara | B60R 21/23138 280/729 |
| 2016/0159313 | A1* | 6/2016 | Fujiwara | B60R 21/233 280/729 |

FOREIGN PATENT DOCUMENTS

| | | |
|---|---|---|
| JP | 2014-133462 A | 7/2014 |
| JP | 2014-136452 A | 7/2014 |
| JP | 2014-141159 A | 8/2014 |
| JP | 2015-030322 A | 2/2015 |

* cited by examiner

VEHICLE SIDE AIRBAG DEVICE AND VEHICLE SEAT

TECHNICAL FIELD

The present invention relates to a vehicle side airbag device that protects a vehicle occupant at the time of a side collision or the like of a vehicle, and to a vehicle seat in which this vehicle side airbag device is installed.

BACKGROUND ART

In the side airbag device described in following Patent Document 1, a side airbag is divided into a first inflating portion (a rear bag portion) and a second inflating portion (a front bag portion) by a partitioning wall (a front-rear partitioning portion) that is provided at the position of the ribs of a vehicle occupant who is at an improper position. An inflator is provided within the first inflating portion, and gas generated from this inflator is supplied to the interior of the front bag portion through a communication hole that is formed at the front-rear partitioning portion. Due thereto, by making the rear bag portion have higher pressure than the front bag portion, the ability at the initial stage to restrain the vehicle occupant who is at the proper position is ensured, and, even if the vehicle occupant is positioned at an improper position (out of position), effects on the vehicle occupant are suppressed.

PRIOR ART DOCUMENTS

Patent Documents

Patent Document 1: Japanese Patent Application Laid-Open (JP-A) No. 2012-025182

SUMMARY OF INVENTION

Technical Problem

However, depending on the vehicle seat, there are cases in which the amount of forward protrusion of a side support portion, in which the side airbag is installed at the seatback, is set to be small. In such a case, there is the possibility that the rear bag portion will greatly inflate and expand further toward the vehicle front side than the front edge portion of the side support portion, and a vehicle occupant who is at an improper position will be affected by the rear bag portion.

In consideration of the above-described circumstances, an object of the present invention is to provide a vehicle side airbag device and a vehicle seat that can prevent or suppress a rear bag portion affecting a vehicle occupant who is at an improper position.

Solution to Problem

A vehicle side airbag device of a first aspect of the present invention comprises: a bag body that is formed in a shape of a bag, that, in a folded-up state, is accommodated within a side support portion of a seat back of a vehicle seat, and that inflates and expands toward a vehicle front side of the side support portion due to gas being supplied to an interior of the bag body; a front-rear partitioning portion that, by a left side partitioning portion and a right side partitioning portion that extend from a flow regulating portion that is tubular and is provided at a rear end portion of the interior of the bag body, partitions the bag body into a front bag portion and a rear bag portion, and partitions the rear bag portion into a left chamber and a right chamber, and that communicates the left and right chambers and an interior of the flow regulating portion; an inflator that is provided within the flow regulating portion, and that generates gas by operating; and a communication opening that is provided at a vertical direction intermediate portion of the flow regulating portion, that passes-through between the left side partitioning portion and the right side partitioning portion, and that communicates the interior of the flow regulating portion and an interior of the front bag portion.

Note that the front-rear, left-right, and vertical directions recited in the first aspect are the directions in the state in which the bag body has inflated and expanded, and correspond to the front-rear of the vehicle front-rear direction, the left and right of the vehicle left-right direction (vehicle transverse direction), and the vertical of the vehicle vertical direction.

In the first aspect, by the left side partitioning portion and the right side partitioning portion that the front-rear partitioning portion has, the bag body is partitioned into the front bag portion and the rear bag portion, and the rear bag portion is partitioned into the left and right chambers. This front-rear partitioning portion has the flow regulating portion whose interior communicates with the left and right chambers, and the inflator is provided at the interior of the flow regulating portion. When this inflator operates, gas is supplied to the left and right chambers of the rear bag portion, and gas is supplied from the communication opening, that is provided at the vertical direction intermediate portion of the flow regulating portion, through between the left side partitioning portion and the right side partitioning portion to the interior of the front bag portion. Due thereto, the bag body inflates and expands toward the vehicle front side of the side support portion of the seat back.

Further, when inflation and expansion of the left and right chambers are completed, due to the left side partitioning portion and the right side partitioning portion being pushed against one another by the internal pressures of the left and right chambers, the communication opening is closed-off. Due thereto, the flow of gas between the front bag portion and the rear bag portion can be cut-off, and therefore, a check valve for cutting-off such a flow of gas is not needed. As a result, simplification and compactness of the structure can be devised.

Further, as described above, the rear bag portion is partitioned into the left and right chambers by the left side partitioning portion and the right side partitioning portion of the front-rear partitioning portion. Therefore, a valley, that is recessed toward the vehicle rear side, is formed at a vehicle transverse direction intermediate portion of the front surface of the rear bag portion that has inflated and expanded. Moreover, at the time when the rear bag portion that has inflated and expanded interferes inadvertently, from the vehicle rear side via the front bag portion, with the vehicle occupant who is in an improper position, the left and right chambers of the rear bag portion move away from each other in the vehicle left-right direction (the vehicle transverse direction), and the above-described valley (recess) is expanded in the vehicle transverse direction and toward the vehicle rear side. Due thereto, in accordance with the present invention, a vehicle occupant who is in an improper position being affected by the rear bag portion can be prevented or suppressed.

In a vehicle side airbag device of a second aspect of the present invention, in the first aspect, at the front-rear partitioning portion, a border portion between the left side partitioning portion and the right side partitioning portion at the flow regulating portion is sewn, and the communication opening is formed due to a portion of the border portion not being sewn.

In the second aspect, at the time of sewing the border portion between the left side partitioning portion and the right side partitioning portion at the flow regulating portion of the front-rear partitioning portion, the communication opening, that communicates the interior of the flow regulating portion and the interior of the front bag portion can be formed by not sewing a portion. Because effects such as described above are obtained merely by setting a simple unsewn portion in this way, the structure can be simplified further, and manufacturing costs can be reduced.

In a vehicle side airbag device of a third aspect of the present invention, in the first or second aspect, the vehicle side airbag device is structured such that inflation and expansion of the front bag portion and the rear bag portion are completed before the inflator that has operated finishes generating gas.

In the third aspect, at the point in time at least when the inflator that has operated finishes generating gas, the inflation and expansion of the front bag portion and the rear bag portion are completed, and the communication opening is closed-off by the internal pressures of the left and right chambers of the rear bag portion. Due thereto, it can be made such that the gas within the rear bag portion does not inadvertently flow into the front bag portion, and therefore, it can be made such that the internal pressure of the rear bag portion does not decrease inadvertently.

A vehicle side airbag device of a fourth aspect of the present invention comprises, in any one of the first through third aspects, a top-bottom partitioning portion that partitions the bag body into the front bag portion and the rear bag portion and a lower bag portion, and the interior of the flow regulating portion and an interior of the lower bag portion communicate via a lower end opening of the flow regulating portion.

In the fourth aspect, at the time when the inflator operates, gas generated from the inflator is supplied to the interior of the front bag portion and the interior of the rear bag portion of the bag body, and is supplied to the interior of the lower bag portion of the bag body via the lower end opening of the flow regulating portion. Due thereto, in addition to the front bag portion and the rear bag portion of the bag body, the lower bag portion inflates and expands. Further, when inflation and expansion of the respective bag portions are completed and the inflator finishes generating gas, the flow regulating portion is crushed by the internal pressures of the left and right chambers of the rear bag portion. Due thereto, the gap between the inner peripheral surface of the flow regulating portion and the outer peripheral surface of the inflator can be closed. As a result, the flow of gas between the interior of the lower bag portion and the interior of the rear bag portion can be cut-off, and therefore, a check valve for cutting-off such a flow of gas is not needed. As a result, even in a structure in which the lower bag portion is provided at the bag body, simplification and compactness of the structure can be devised.

In a vehicle side airbag device of a fifth aspect of the present invention, in the fourth aspect, a check valve, that limits flow of gas from the lower bag portion to the rear bag portion, is provided at a lower end portion of the flow regulating portion.

In the fifth aspect, the flow of gas between the lower bag portion and the rear bag portion can be cut-off more reliably.

In a vehicle side airbag device of a sixth aspect of the present invention, in any one of the first through fifth aspects, an upper portion of the rear bag portion is not partitioned into the left and right chambers, and an upper end opening of the flow regulating portion opens at a non-partitioned region at which the upper portion of the rear bag portion is not partitioned, and the left and right chambers and the interior of the flow regulating portion communicate via the upper end opening.

In the sixth aspect, at the time when the inflator operates, gas generated from the inflator is supplied from the upper end opening of the flow regulating portion to the upper portion of the rear bag portion. Due thereto, the upper portion of the rear bag portion can be inflated and expanded at an early stage. Further, the upper portion of the rear bag portion is not partitioned into the left and right chambers, and gas is distributed through this non-partitioned region to the left and right chambers. Due thereto, gas can be distributed well to the left and right chambers.

In a vehicle side airbag device of a seventh aspect of the present invention, in the fourth or fifth aspect, a vent hole is formed in each of or in some of the front bag portion, the rear bag portion, and the lower bag portion.

In the seventh aspect, as described in the fourth aspect, when inflation and expansion of the respective bag portions are completed and the inflator finishes generating gas, the flow of gas between the front bag portion, the rear bag portion and the lower bag portion can be cut-off. Due thereto, the respective bag portions can be made to be respectively independent. However, in the present aspect, because a vent hole is formed in each of or in some of the respective bag portions, the internal pressure of a bag portion in which a vent hole is formed can be adjusted individually by the venting of gas from the vent hole.

In an eighth aspect, in any one of the first through seventh aspects, the left and right chambers are formed so as to be left-right asymmetric.

Because the eight aspect is structured as described above, at the time of folding-up the bag body and the front-rear partitioning portion, it can be made such that the sewn portions, and the like, of the left side partitioning portion and the right side partitioning portion and the bag body do not overlap. Due thereto, the bag body and the front-rear partitioning portion can be folded-up compactly.

In a vehicle side airbag device of a ninth aspect of the present invention, in any one of the first through eighth aspects, an additional communication opening, that communicates the interior of the front bag portion and an interior of the rear bag portion, is formed at the front-rear partitioning portion.

In the ninth aspect, gas, that has been supplied from the inflator to the interior of the rear bag portion, can be supplied to the interior of the front bag portion via the additional communication opening. Due thereto, the inflation and expansion completion times of the front bag portion and the rear bag portion can be offset intentionally, and therefore, the inflation and expansion completion times of the front bag portion and the rear bag portion can be optimized (fine tuned) in accordance with, for example, differences in types of vehicles or the like.

In a vehicle side airbag device of a tenth aspect of the present invention, in any one of the first through third aspects, the flow regulating portion is disposed at a vertical direction intermediate portion of a rear end portion of the interior of the bag body, dimensions in a vertical direction of the left side partitioning portion and the right side partitioning portion become larger further toward front end edge portion sides that are sewn to the bag body, regions that are not partitioned into the left and right chambers are provided respectively at an upper portion and a lower portion of the rear bag portion, and an upper end opening and a lower end opening of the flow regulating portion open at the regions, and the left and right chambers and the interior of the flow regulating portion communicate via the upper end opening and the lower end opening.

In the tenth aspect, at the time when the inflator operates, gas generated from the inflator is supplied to the upper portion and the lower portion of the rear bag portion from the upper end opening and the lower end opening of the flow regulating portion. Due thereto, the upper portion and the lower portion of the rear bag portion can be inflated and expanded at an early stage. Further, the upper portion and the lower portion of the rear bag portion are not partitioned into left and right chambers, and gas is distributed to the left and right chambers through these non-partitioned regions. Due thereto, gas can be distributed well to the left and right chambers.

In a vehicle side airbag device of an eleventh aspect of the present invention, in any one of the first through tenth aspects, portions, that are further toward an upper end side than the flow regulating portion, of the left side partitioning portion and the right side partitioning portion are configured to be forwardly extending portions that are tilted obliquely toward a side opposite the flow regulating portion, and a front extension portion, that is disposed above the front bag portion in a inflated and expanded state, is provided at an upper portion of the rear bag portion.

In the eleventh aspect, in the state in which the bag body is inflated and expanded, the front extension portion, that is provided at the upper portion of the rear bag portion, is disposed above the front bag portion. Due thereto, for example, the wide range of the shoulder portion of the vehicle occupant can be restrained by the above-described front extension portion, i.e., the upper portion of the rear bag portion.

A vehicle seat of a twelfth aspect of the present invention comprises: a seat main body having a seat cushion and a seat back; and the vehicle side airbag device of any one of the first through eleventh aspects that is provided at the seat back.

Because the twelfth aspect has the vehicle side airbag device of any one of the first through tenth aspects, operation and effects such as described above are achieved.

Advantageous Effects of Invention

As described above, in the vehicle side airbag device and vehicle seat relating to the present invention, a vehicle occupant who is in an improper position being affected by a rear bag portion can be prevented or suppressed.

DESCRIPTION OF EMBODIMENTS

<First Embodiment>

A vehicle side airbag device 11 and a vehicle seat 12 relating to a first embodiment of the present invention are described on the basis of FIG. 1 through FIG. 9. Note that arrow FR, arrow UP and arrow OUT that are shown appropriately in the respective drawings respectively indicate the front direction (the advancing direction) of the vehicle, the upward direction, and the outer side in the transverse direction. Hereinafter, when description is given by using merely the front-rear, vertical, and left-right directions, they mean the front-rear of the vehicle front-rear direction, the vertical of the vehicle vertical direction, and the left and right when facing in the advancing direction, unless otherwise stated.

(Structure)

Figure 1:
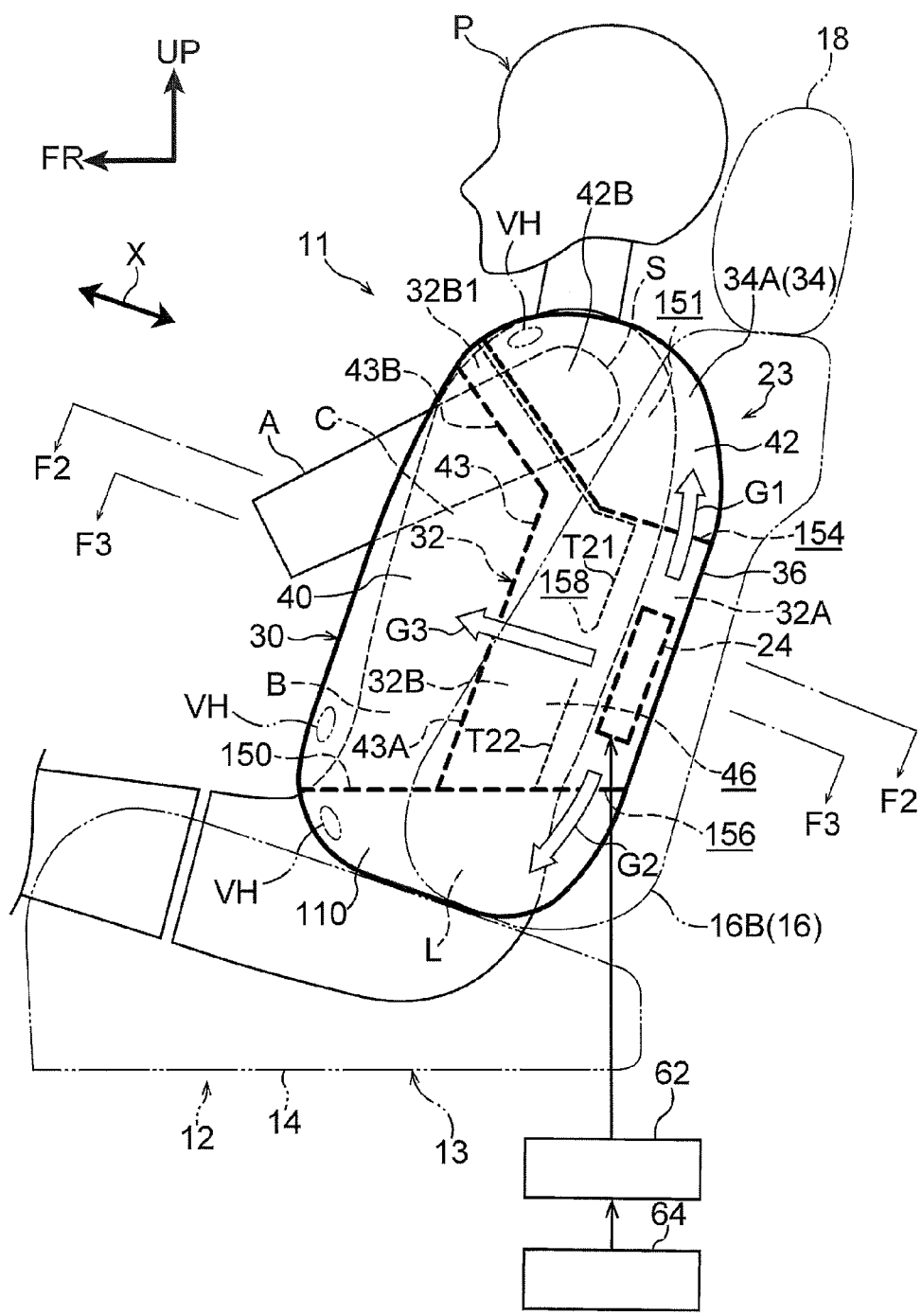
FIG. 1 is a schematic side view of a vehicle seat relating to a first embodiment of the present invention, and is a drawing showing a state of completion of inflation and expansion of a side airbag that a vehicle side airbag device has.

The vehicle seat 12 shown in FIG. 1 is, for example, the front seat of an automobile. A seat main body 13 of this vehicle seat 12 has a seat cushion 14 on which a vehicle occupant P sits, a seat back 16 that supports the back portion of the vehicle occupant P, and a headrest 18 that supports the head portion of the vehicle occupant P. Note that, in the present embodiment, the front-rear direction, left-right direction (transverse direction), and vertical direction of the vehicle seat 12 coincide with the front-rear direction, left-right direction (transverse direction), and vertical direction of the vehicle. Further, the vehicle occupant P shown in FIG. 1 is a dummy for a crash test. This dummy is, for example, an AM50 (50th percentile U.S. adult male) World SID (internationally standardized side crash dummy: World Side Impact Dummy).

A side support portion 16B is provided at the side portion at the vehicle transverse direction outer side of the seat back 16. The side support portion 16B projects-out (swells-out) further toward the vehicle front side than a backrest surface 16A (see FIG. 7A and FIG. 7B) of the seatback 16, and is structured so as to support the vehicle occupant P from the vehicle transverse direction outer side. A side airbag 23, that is a structural member of the present vehicle side airbag device 11, and an inflator 24 (gas generating device), that generates gas at the interior of the side airbag 23, are accommodated within this side support portion 16B.

The side airbag 23 is disposed within the side support portion 16B in a state of being folded-up and made into a module together with the inflator 24. Due to the pressure of the gas that is generated from the inflator 24, this side airbag 23 inflates and expands between the vehicle occupant P and a vehicle body side portion (a door trim 28 of a side door 26 shown in FIG. 9A and FIG. 9B). At the time of this inflation and expansion, a pad material and a skin material, that are not illustrated and that are disposed at the side support portion 16B, receive the inflation pressure of the side airbag 23 and are ruptured. Note that, unless stated otherwise, the front-rear, left-right, and vertical directions of the side airbag 23 in the following description mean the directions the state in which side airbag 23 has inflated and expanded, and substantially coincide with the front-rear, left-right, and vertical directions of the seat back 16.

Figure 2:
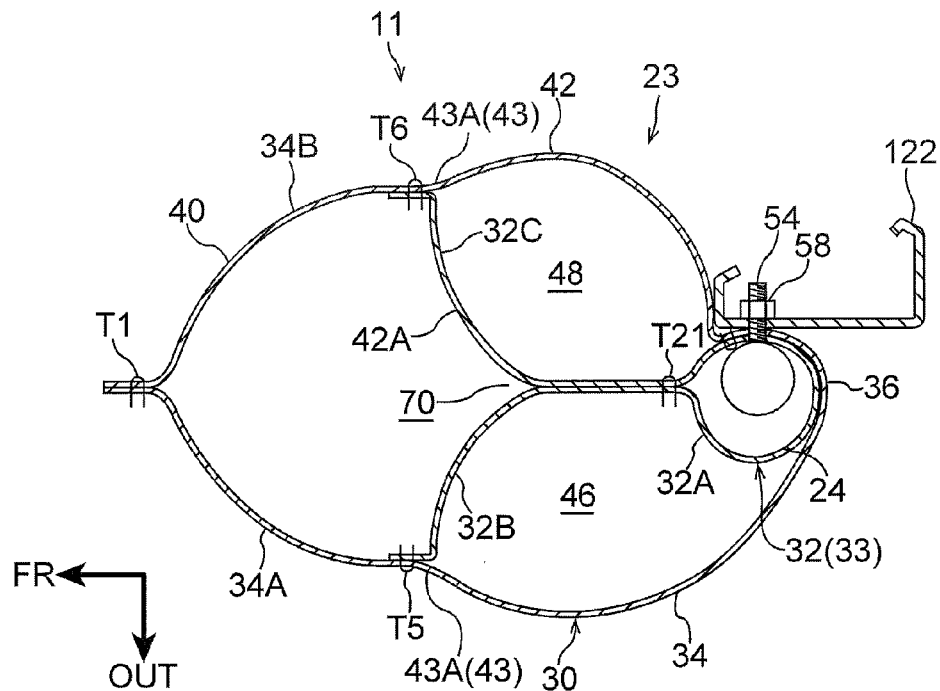
FIG. 2 is an enlarged sectional view showing, in an enlarged manner, the cross-section along line F2-F2 of FIG. 1.
Figure 3:
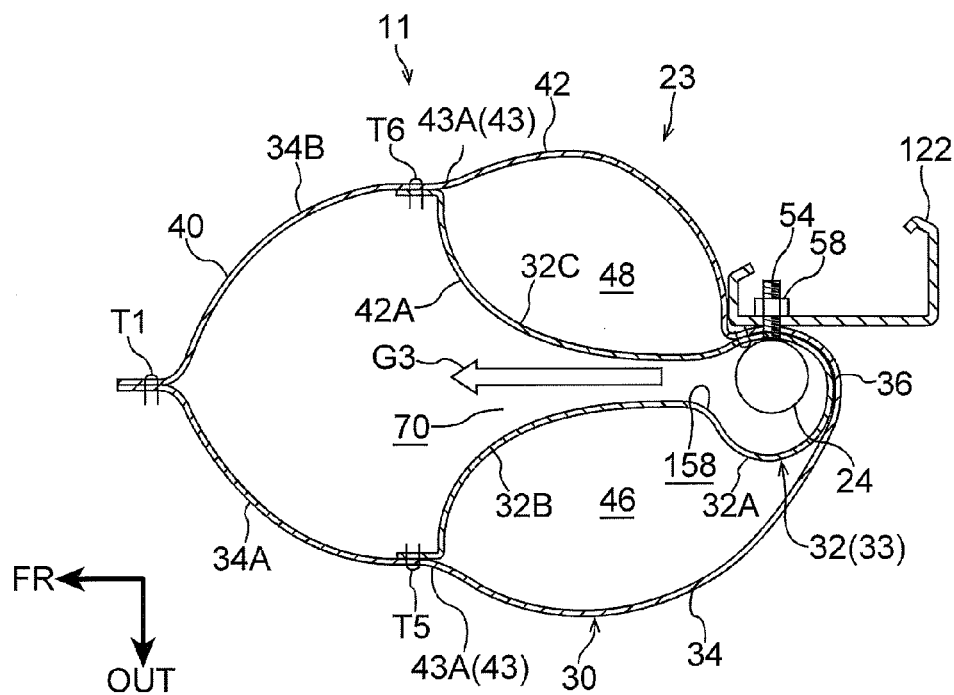
FIG. 3 is an enlarged sectional view showing, in an enlarged manner, the cross-section along line F3-F3 of FIG. 1, and is a drawing showing a state in the midst of inflation and expansion of the side airbag relating to the first embodiment.

As shown in FIG. 1 through FIG. 3, the side airbag 23 is structured by a bag body 30 that is formed in the shape of a bag, a front-rear partitioning cloth 32 that serves as a front-rear partitioning portion and that partitions the interior of the bag body 30 front and rear, and a top-bottom partitioning cloth 150 that serves as a top-bottom partitioning portion and that partitions the interior of the bag body 30 up and down. The bag body 30 is formed in the shape of an elongated bag by, for example, a single base cloth 34, that is formed by cutting-out a nylon or polystyrene cloth material, being folded in two along a fold line 36, and the outer peripheral edge portion being sewn at sewn portion T1. When the state of completion of inflation and expansion is seen in a side view as shown in FIG. 1, the bag body 30 is formed in a substantially elliptical shape (a substantially rectangular shape) that is elongated along the vertical direction of the seat back 16, and is set to a size that can restrain a shoulder portion S, a chest region C, an abdominal region B and a lumbar region L of the vehicle occupant P. Note that illustration of the sewn portion T1 and sewn portions T5 through T7 that are described later is omitted from FIG. 1.

Figure 4:
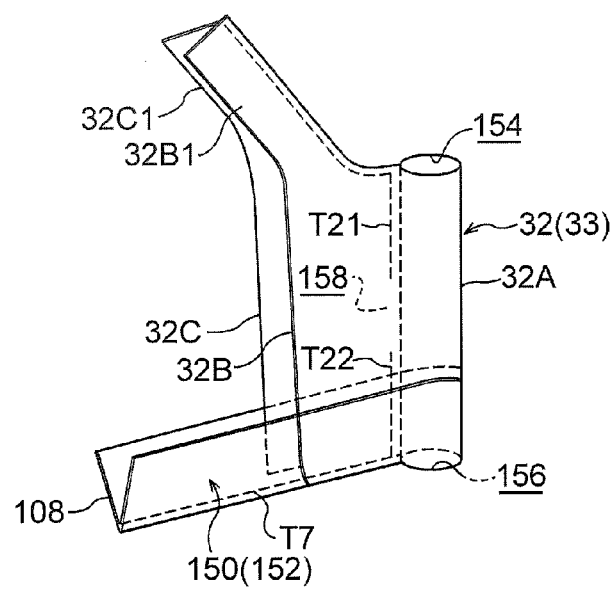
FIG. 4 is a perspective view showing a front-rear partitioning cloth and a top-bottom partitioning cloth that the side airbag relating to the first embodiment has.

On the other hand, the front-rear partitioning cloth 32 is formed by a single base cloth 33, that is formed by cutting-out a cloth material that is similar to the material of the bag body 30, being folded in two as shown in FIG. 4, and being sewn at a pair of upper and lower sewn portions T21, T22. As shown in FIG. 2, this front-rear partitioning cloth 32 integrally has a flow regulating portion 32A that is tubular, and a left side partitioning portion 32B and a right side partitioning portion 32C that are a pair of left and right forwardly extending portions. The left side partitioning portion 32B and the right side partitioning portion 32C are formed in the shapes of elongated strips that are long in the length direction of the bag body 30. Ones of long side edge portions (the rear end edge portions) thereof, that are positioned at the border portion with the flow regulating portion 32A, are sewn together at the sewn portions T21, T22.

The axial direction of the flow regulating portion 32A runs along the length directions of the left side partitioning portion 32B and the right side partitioning portion 32C, and the flow regulating portion 32A is connected integrally to the left side partitioning portion 32B and the right side partitioning portion 32C. This flow regulating portion 32A is disposed at a vertical direction intermediate portion of the rear end portion of the bag body 30 interior. This flow regulating portion 32A is a flow regulating cloth (flow regulating member) that is for regulating the flow of gas from the aforementioned inflator 24, and is structured by a portion of the front-rear partitioning cloth 32, and therefore is flexible.

Figure 5:
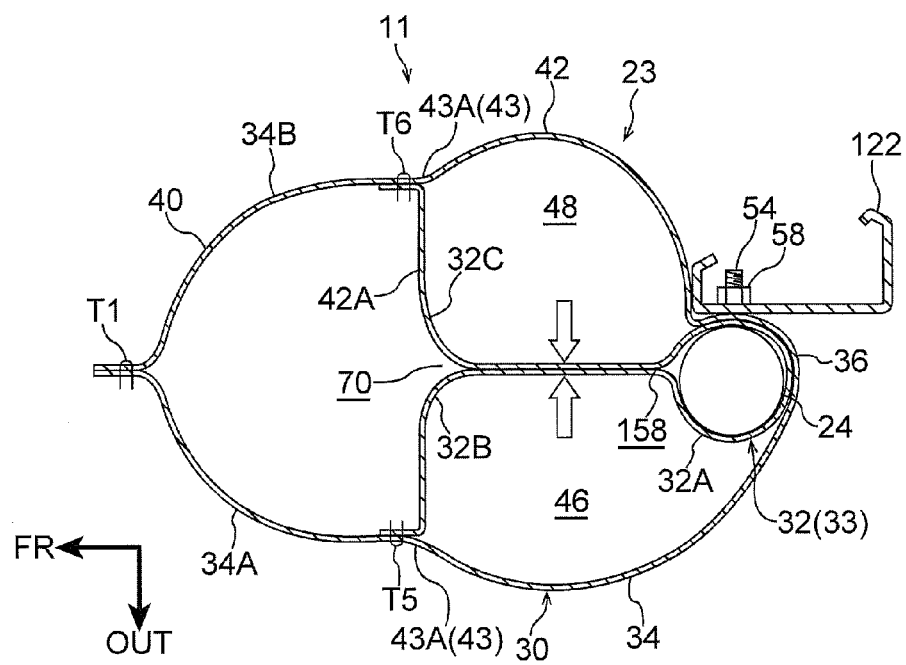
FIG. 5 is an enlarged sectional view showing, in an enlarged manner, the cross-section along line F3-F3 of FIG. 1, and is a drawing showing the state of completion of inflation and expansion of the side airbag relating to the first embodiment.

As shown in FIG. 2, FIG. 3 and FIG. 5, the other (the front end edge portion) of the long side edge portions of the left side partitioning portion 32B is sewn to a front-rear direction intermediate portion of one side portion 34A of the base cloth 34 at the sewn portion T5 that extends in the length direction of the bag body 30. Further, the other (the front end edge portion) of the long side edge portions of the right side partitioning portion 32C is sewn to a front-rear direction intermediate portion of another side portion 34B of the base cloth 34 at the sewn portion T6 that extends in the length direction of the bag body 30.

Further, as shown in FIG. 4, the portions, that are further toward the upper end side than the flow regulating portion 32A, of the left side partitioning portion 32B and the right side partitioning portion 32C are forwardly extending portions 32B1, 32C1 that are tilted at an incline toward the side opposite the flow regulating portion 32A. The width dimensions of the left side partitioning portion 32B and the right side partitioning portion 32C decrease at these forwardly extending portions 32B1, 32C1. Ones of long side edge portions of these forwardly extending portions 32B1, 32C1 are sewn together by the sewn portion T21 that extends toward the upper side, and the others of the long side edge portions are respectively sewn to the one side portion 34A and the other side portion 34B of the base cloth 34 at the sewn portions T5, T6.

The front-rear partitioning cloth 32 that has the above-described structure partitions the interior of the bag body 30 into a front bag portion 40 and a rear bag portion 42. Further, the front-rear partitioning cloth 32 partitions the interior of the rear bag portion 42 into a left chamber 46 and a right chamber 48 by the left side partitioning portion 32B and the right side partitioning portion 32C that extend in a bifurcated shape from the outer peripheral portion of the flow regulating portion 32A, that is positioned at the rear end portion of the interior of the rear bag portion 42, toward a front-rear direction intermediate portion of the bag body 30. Front edge portions 43 (see FIG. 1 through FIG. 3 and FIG. 5) of the left and right chambers 46, 48 at the rear bag portion 42 are structured by vertically extending portions 43A that extend along the vertical direction of the seat back 16, and inclined portions 43B that extend toward a vehicle obliquely upper front side from the upper ends of the vertically extending portions 43A. Note that the vertical direction of the seat back 16 in the present embodiment is the direction running along the backrest surface 16A of the seat back 16 as seen in a side view (as seen in the vehicle transverse direction).

At the side airbag 23 at which the interior of the bag body 30 is partitioned by the front-rear partitioning cloth 32 having the above-described structure, a front extension portion 42B, that extends toward the upper side of the front bag portion 40, is formed at the upper portion of the rear bag portion 42. The upper portion (region 151 shown in FIG. 1) of the rear bag portion 42 including this front extension portion 42B is a structure that is not divided (is not partitioned) into the left chamber 46 and the right chamber 48.

The flow regulating portion 32A does not reach to the top end edge of the rear bag portion 42, and an upper end opening 154 opens at the aforementioned region that is not divided (the aforementioned region 151) at the upper portion of the rear bag body 42. The left and right chambers 46, 48 and the interior of the flow regulating portion 32A communicate with one another via this upper end opening 154. Further, as shown in FIG. 1 and FIG. 3, a communication opening 158 (flow path: inner vent hole) is formed between the above-described pair of upper and lower sewn portions T21, T22. This communication hole 158 is formed by a portion (between the sewn portions T21, T22 that are divided up and down) of the border portion between the left side partitioning portion 32B and the right side partitioning portion 32C at the flow regulating portion 32A not being sewn, and is provided at a vertical direction intermediate portion of the flow regulating portion 32A. This communication opening 158 passes-through between the left side partitioning portion 32B and the right side partitioning portion 32C, and communicates the interior of the flow regulating portion 32A and the interior of the front bag portion 40 with one another.

Further, at the above-described front-rear partitioning cloth 32, the left side partitioning portion 32B and the right side partitioning portion 32C do not reach to the bottom end edge of the bag body 30, and a lower bag portion 110, that is partitioned into the front bag portion 40 and the rear bag portion 42 by the top-bottom partitioning cloth 150, is provided at the lower portion of the bag body 30. This top-bottom partitioning cloth 150 is formed by a base cloth 152 (see FIG. 4), that is cut-out in an elongated rectangular shape, being folded in two at the transverse direction central portion (short direction central portion) thereof, and being folded-back at the sewn portion T7, and the front and rear portions (lower edge portions) being sewn. At this top-bottom partitioning cloth 150, the pair of long side edge portions, that are positioned at sides opposite one another across the sewn portion T7, are sewn respectively to the one side portion 34A and the other side portion 34B of the base cloth 34 at unillustrated sewn portions. Further, this top-bottom partitioning cloth 150 is sewn to the lower end portion of the front-rear partitioning cloth 32 at unillustrated sewn portions.

The aforementioned sewn portion T7 is omitted at the region, that faces of the flow regulating portion 32A, of the rear end portion of the top-bottom partitioning cloth 150, and an unillustrated opening, that communicates a lower end opening 156 of the flow regulating portion 32A with the interior of the lower bag portion 110, is formed. The interior of the flow regulating portion 32A and the interior of the lower bag portion 110 communicate with one another via this opening and the lower end opening portion 156.

On the other hand, the inflator 24 is a so-called cylinder-type inflator, and is formed in a solid cylindrical shape. This inflator 24 is accommodated at the inner side of the flow regulating portion 32A in a state in which the axial direction of the inflator 24 runs along the vertical direction of the seat back 16. The dimension, in the vertical direction of the seatback 16, of the flow regulating portion 32A is set to be longer than that of the inflator 24, and the inflator 24 is disposed at a vertical direction intermediate portion of the interior of the flow regulating portion 32A. A pair of upper and lower stud bolts 54 project-out toward the vehicle transverse direction inner side (the seat transverse direction inner side) from the outer peripheral portion of the inflator 24. These stud bolts 54 pass-through the flow regulating portion 32A and the bag body 30, and pass-through a side frame portion 122 of a seat back frame that is a skeleton member of the seat back 16, and nuts 58 are screwed-together with the distal end sides of the stud bolts 54. Due thereto, the inflator 24 is, together with the side airbag 23, fastened and fixed (so-called side-surface fastening) to the side frame portion 122.

Note that there may be a structure (so-called back surface fastening) in which the stud bolts 54, that project-out toward the vehicle rear side from the outer peripheral portion of the inflator 24, pass-through the flow regulating portion 32A, the bag body 30 and a fixing bracket that is fixed to the side frame portion 122, and are screwed-together with the nuts 58.

As shown in FIG. 1, a side collision ECU 62 that is installed in the vehicle is electrically connected to the above-described inflator 24. A side collision sensor 64 that senses a side collision is electrically connected to this side collision ECU 62. The side collision ECU 62 is structured to operate the inflator 24 at the time of sensing (the inevitability of) a side collision on the basis of a signal from the side collision sensor 64. Note that, in a case in which a pre-crash sensor that forecasts (predicts) a side collision is electrically connected to the side collision ECU 62, there may be a structure in which the inflator 24 is operated at the time when the side collision ECU 62 forecasts a side collision on the basis of a signal from the pre-crash sensor.

In the side airbag device 11 of the above-described structure, when the inflator 24 operates, gas is jetted-out radially from gas jet-out ports that are provided in the upper end portion or the lower end portion of the inflator 24. Gas that is jetted-out from the inflator 24 is supplied from the upper end opening 154 of the flow regulating portion 32A to the interior of the rear bag portion 42 (refer to arrow G1 of FIG. 1), and is distributed into the left and right chambers 46, 48. Further, gas that is jetted-out from the inflator 24 is distributed from the lower end opening 156 of the flow regulating portion 32A into the lower bag portion 110 (refer to arrow G2 of FIG. 1). Moreover, gas that is jetted-out from the inflator 24 is distributed from the communication opening 158, that is provided at a vertical direction intermediate portion of the flow regulating portion 32A, through between the left side partitioning portion 32B and the right side partitioning portion 32C to the interior of the front bag portion 40 (refer to arrow G3 of FIG. 1 and FIG. 3). Due thereto, the bag body 30 of the side airbag 23 inflates and expands at the front of the side support portion 16B, i.e., between the vehicle occupant P and the door trim 28.

Here, the present embodiment is structured (set) such that, at the point in time (at the timing) when the inflator 24 that has operated finishes generating gas, the inflation and expansion of the front bag portion 40, the rear bag portion 42 and the lower bag portion 110 are completed simultaneously or substantially simultaneously. Namely, the output of the inflator 24, and the respective opening surface areas of the upper end opening 154, the lower end opening 156 and the communication opening 158 are set such that the inflation and expansion of the respective bag portions are completed at the above-described timing. Note that the output of the inflator 24 is not limited to that described above, and it suffices for the inflation and expansion of the front bag portion 40, the rear bag portion 42 and the lower bag portion 110 to be completed before the inflator 24 that has operated finishes generating gas.

Further, in the present embodiment, when the inflation and expansion of the left and right chambers 46, 48 of the rear bag portion 42 are completed, as shown in FIG. 5, the left side partitioning portion 32B and the right side partitioning portion 32C are pushed against one another due to the internal pressures of the left and right chambers 46, 48. Due thereto, the communication opening 158 is closed-off, and flow of gas between the interior of the front bag portion 40 and the interior of the rear bag portion 42 is cut-off.

Moreover, when inflation and expansion of the left and right chambers 46, 48 of the rear bag portion 42 are completed and the inflator 24 finishes generating gas, the flow regulating portion 32A is crushed by the internal pressures of the left and right chambers 46, 48. Due thereto, as shown in FIG. 5, the inner peripheral surface of the flow regulating portion 32A is pushed against the outer peripheral surface of the inflator 24, and the gap between the inner peripheral surface of the flow regulating portion 32A and the outer peripheral surface of the inflator 24 is closed. As a result, the flow of gas between the interior of the lower bag portion 110 and the interior of the rear bag portion 42 is cut-off (limited). Further, the region that is further toward the upper side and the region that is further toward the lower side than the inflator 24 at the flow regulating portion 32A (see FIG. 1) are crushed by the internal pressures of the left and right chambers 46, 48. Due thereto as well, the flow of gas between the interior of the lower bag portion 110 and the interior of the rear bag portion 42 is cut-off. There is a structure in which, in this state in which inflation and expansion of the side airbag 23 have been completed, the relationship P2<P1<P3 is established between internal pressure P1 of the left and right chambers 46, 48 of the rear bag portion 42, and internal pressure P2 of the front bag portion 40, and internal pressure P3 of the lower bag portion 110. This relationship of internal pressures can be adjusted by appropriately setting and changing the respective opening surface areas of the upper end opening 154, the lower end opening 156 and the communication opening 158.

Figure 6A:
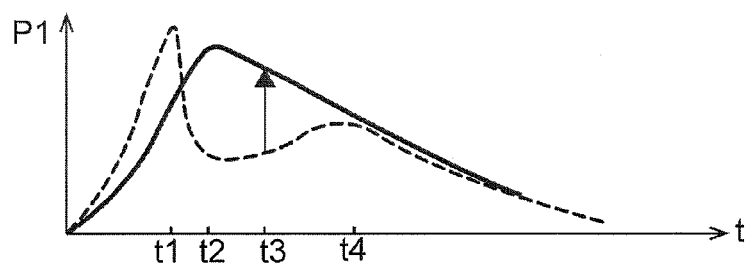
FIG. 6A is a graph showing the relationship between internal pressure of a rear bag portion, that the side airbag relating to the first embodiment has, and time from operation of an inflator.
Figure 6B:
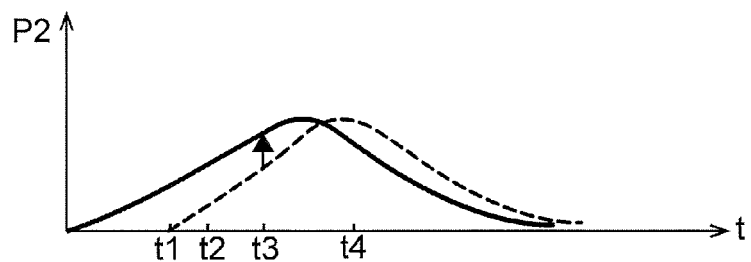
FIG. 6B is a graph showing the relationship between internal pressure of a front bag portion, that the side airbag relating to the first embodiment has, and time from operation of the inflator.

Note that the relationship between time (t) from the inflator 24 operating and the internal pressure (P1) of the rear bag portion 42 is shown by the graph of the solid line in FIG. 6A. Further, the relationship between this time (t) and the internal pressure (P2) of the front bag portion 40 is shown by the graph of the solid line in FIG. 6B. Moreover, the relationship between this time (t) and reaction force (F) that the vehicle occupant P receives from the side airbag 23 is shown by the graph of the solid line in FIG. 6C. The side airbag 23 in the state in which inflation and expansion are completed is described in detail hereinafter.

As shown in FIG. 1, the front bag portion 40 inflates and expands at the vehicle front side of the rear bag portion 42, and the lower bag portion 110 inflates and expands beneath the front bag portion 40 and the rear bag portion 42. The top-bottom partitioning cloth 150 is set such that, when the state in which inflation and expansion of the side airbag 23 are completed is viewed from the vehicle transverse direction, the top-bottom partitioning cloth 150 is inclined forwardly downward with respect to the front-rear direction of the seat back 16 (the direction along arrow X of FIG. 1). Due thereto, there is a structure in which the inflated thickness in the vehicle vertical direction at the lower bag portion 110 that has inflated and expanded becomes smaller the further toward the vehicle front side. The lumbar region L of the vehicle occupant P is restrained by this lower bag portion 110. Note that the front-rear direction of the seat back 16 is the direction that is orthogonal to the vertical direction of the seat back 16 as seen in a seat side view.

Further, of the front edge portions 43 (the front end edge portions) of the rear bag portion 42, the vertically extending portions 43A extend so as to run along the vertical direction of the seat back 16, and face, in the vehicle transverse direction, the front-rear direction central portions of the chest region C and the abdominal region B of the vehicle occupant P who is positioned at the proper position. Due thereto, the front portions (front half portions) of the chest region C and the abdominal region B of the vehicle occupant P are restrained by the front bag portion 40, and the rear portions (rear half portions) of the chest region C and the abdominal region B of the vehicle occupant P are restrained by the rear bag portion 42.

As shown in FIG. 5, when viewing the state in which inflation and expansion of the side airbag 23 are completed in a plan sectional view at the height of the vertically extending portions 43A, the left chamber 46 and the right chamber 48 of the rear bag portion 42 are lined-up in the vehicle transverse direction. Further, the left side partitioning portion 32B and the right side partitioning portion 32C, that partition these left and right chambers 46, 48 and the front bag portion 40, extend in a shape that is bifurcated from the flow regulating portion 32A toward a front-rear direction intermediate portion of the bag body 30, and are lined-up in the vehicle transverse direction. Due thereto, a valley 70 (concave portion) that is recessed toward the vehicle rear side is formed at a vehicle transverse direction intermediate portion of a front surface 42A of the rear bag portion that is structured by the left side partitioning portion 32B and the right side partitioning portion 32C. This valley 70 can also be interpreted as being formed by the vehicle transverse direction central portion of the rear surface of the front bag portion 40 projecting toward the vehicle rear side, and extends along the vertical direction of the side airbag 23.

Further, as shown in FIG. 1, of the front edge portions 43 (the front end edge portions) of the rear bag portion 42, the inclined portions 43B extend toward a vehicle obliquely upper front side from the upper ends of the vertically extending portions 43A. These inclined portions 43B are inclined, with respect to the front-rear direction of the seatback 16 (the direction along arrow X of FIG. 1), so as to rise higher the further toward the front side of the seat back 16. Note that the angle of inclination of the inclined portions 43B with respect to the front-rear direction of the seatback 16 is preferably set within a range of 30 to 60°, and more preferably set within a range of 40 to 50°.

Due to the inclined portions 43B being set as described above, the front extension portion 42B that is provided at the upper portion of the rear bag portion 42 extends from the side of the shoulder portion S of the vehicle occupant P and is disposed above the front bag portion 40. The inflated thickness in the vehicle transverse direction of this front extension portion 42B is set so as to be smaller than the inflated thickness in the vehicle transverse direction of the front bag portion 40. Due thereto, the vehicle transverse direction inner side surface at the upper portion of the front bag portion 40 is an upper arm portion push-up surface that is curved or inclined so as to rise while heading toward the vehicle transverse direction outer side (the further this inner side surface heads upward, the further it heads toward the vehicle transverse direction outer side).

Further, when viewing the state in which inflation and expansion of the side airbag 23 are completed from the vehicle transverse direction, the above-described inclined portions 43B are set so as to be positioned in a vicinity of the center between the center of the shoulder portion S of the vehicle occupant P and the length direction central portion of an upper arm portion A. Further, in vicinities of these inclined portions 43B, the vehicle transverse direction inner side surfaces of the side airbag 23 are recessed toward the vehicle transverse direction outer sides, and concave portions are formed. These concave portions extend along the inclined portions 43B so as to extend toward an obliquely upper front side of the seat back 16. Note that the center of the shoulder portion S of the vehicle occupant P here is the axial center of the bolt that is provided at the shoulder portion S of the World SID, and the length direction central portion of the upper arm portion A is the position of the center of gravity of the upper arm portion A or a position in the vicinity of the center of gravity.

(Operation and Effects)

Operation and effects of the present first embodiment are described next.

In the side airbag device 11 of the above-described structure, when the side collision ECU 62 senses a side collision by a signal from the side collision sensor 64, the inflator 24 is operated by this ECU 62, and gas is jetted-out from the inflator 24. Gas jetted-out from the inflator 24 is supplied from the upper end opening 154 of the flow regulating portion 32A that the front-rear partitioning cloth 32 of the side airbag 23 has, to the left and right chambers 46, 48 of the rear bag portion 42, and is supplied from the lower end opening 156 of the flow regulating portion 32A to the interior of the lower bag portion 110. Moreover, gas jetted-out from the inflator 24 passes from the communication opening 158, that is provided at a vertical direction intermediate portion of the flow regulating portion 32A, through between the left side partitioning portion 32B and the right side partitioning portion 32C, and is supplied directly to the interior of the front bag portion 40 (i.e., without going through the rear bag portion 42). Due thereto, the bag body 30, i.e., the side airbag 23, inflates and expands toward the vehicle front side of the side support portion 16B of the seat back 16 (refer to FIG. 1 and FIG. 7(A)).

Then, when inflation and expansion of the left and right chambers 46, 48 are completed, due to the left side partitioning portion 32B and the right side partitioning portion 32C being pushed against one another by the internal pressures of the left and right chambers 46, 48, the communication opening 158 is closed-off (see FIG. 5). Due thereto, the flow of gas between the front bag portion 40 and the rear bag portion 42 can be cut-off, and therefore, a check valve for cutting-off such a flow of gas is not needed. As a result, simplification and compactness of the structure can be devised.

Further, as described above, the rear bag portion 42 is partitioned into the left and right chambers 46, 48 by the left side partitioning portion 32B and the right side partitioning portion 32C of the front-rear partitioning cloth 32, and therefore, the valley 70 that is recessed toward the vehicle rear side is formed at a vehicle transverse direction intermediate portion of the front surface of the rear bag portion 42 that has inflated and expanded. Due thereto, even if the vehicle occupant is positioned at an improper position (out of position) at the front of the side support portion 16B, this vehicle occupant being affected by the rear bag portion 42 can be prevented or suppressed.

Moreover, in the present embodiment, the rear bag portion 42 is partitioned into the left and right chambers 46, 48 by the left side partitioning portion 32B and the right side partitioning portion 32C that are lined-up in the vehicle transverse direction in the state in which the side airbag 23 has inflated and expanded. Therefore, at the time that the rear bag portion 42 that has inflated and expanded inadvertently interferes, via the front bag portion 40 and from the vehicle rear side, with a vehicle occupant or cargo or the like (refer to cargo 72 shown in FIG. 7B) that is positioned in front of the side support portion 16B, the left and right chambers 46, 48 move apart from one another (the state shown in FIG. 7B). Due thereto, the above-described valley 70 is enlarged in the vehicle transverse direction and toward the vehicle rear side, and therefore, effects on the vehicle occupant or the cargo 72 or the like that is positioned at an improper position can be effectively reduced.

Further, in the present embodiment, the border portion between the left side partitioning portion 32B and the right side partitioning portion 32C at the flow regulating portion 32A of the front-rear partitioning cloth 32 is sewn at sewn portions T21, T22, and the communication opening 158 is formed due to a portion of the above-described border portion not being sewn. Therefore, at the time of sewing the above-described border portion, the communication opening 158, that communicates the interior of the flow regulating portion 32A and the interior of the front bag portion 40, can be formed by not sewing the portion. Because the above-described effects are obtained merely by setting a simple unsewn portion in this way, the structure can be simplified even more, and manufacturing costs can be reduced.

Moreover, in the present embodiment, at the point in time when the inflator 24 that has operated finishes generated gas, the inflation and expansion of the front bag portion 40, the rear bag portion 42 and the lower bag portion 110 are completed, and the communication opening 158 is closed-off by the internal pressures of the left and right chambers 46, 48 of the rear bag portion 42. Due thereto, it can be made such that the gas within the rear bag portion 42 does not inadvertently flow into the front bag portion 40, and therefore, it can be made such that the internal pressure P1 of the rear bag portion 42 does not decrease inadvertently.

Namely, for example, in a structure in which gas, that has been supplied from an inflator into a rear bag portion, is supplied through an inner vent hole into a front bag portion, inflation and expansion of the front bag portion are completed later than the rear bag portion. In the case of such a structure, as shown by the dashed lines in FIG. 6A and FIG. 6B, the internal pressure P1 of the rear bag portion decreases during the time from point in time t1, when the inflation and expansion of the rear bag portion are completed, to point in time t3, when the inflation and expansion of the front bag portion are completed. As a result, as shown by the dashed line in FIG. 6C, at the point in time t3, a drop occurs in the reaction force F that the vehicle occupant P receives from the side airbag 23. Note that, in FIG. 6A through FIG. 6C, t2 shows the point in time when the inflator 24 finishes generating gas (the timing of the end of gas blow-out), and t4 shows the point in time when the reaction force F is a maximum.

Figure 6C:
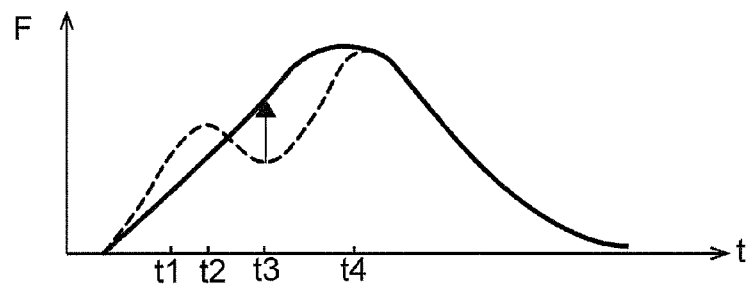
FIG. 6C is a graph showing the relationship between reaction force that a vehicle occupant receives from the side airbag relating to the first embodiment, and time from operation of the inflator.
Figure 7A:
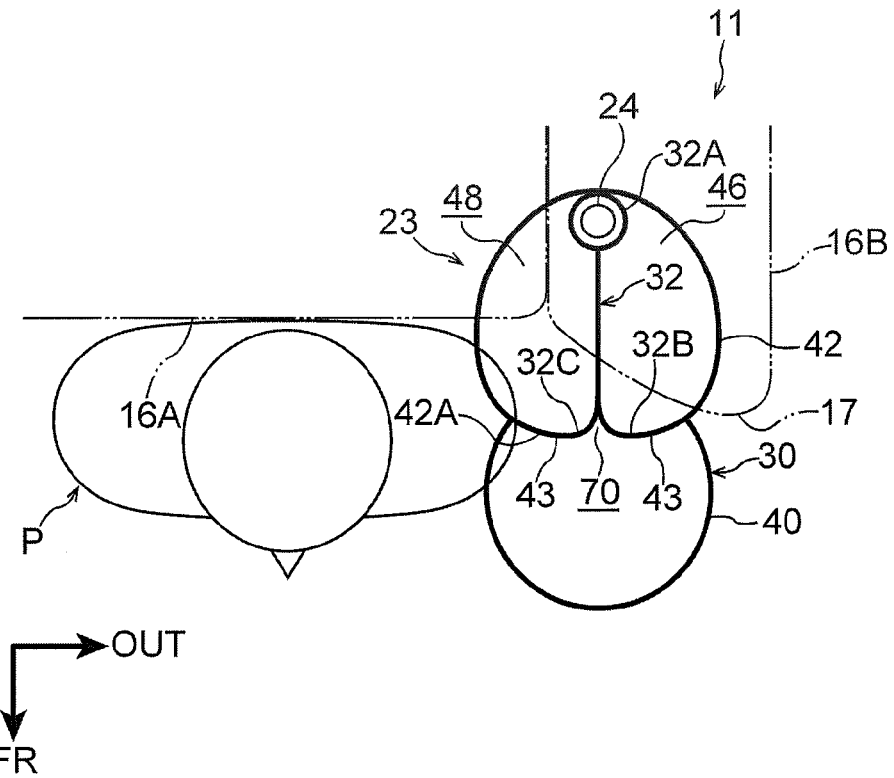
FIG. 7A is a schematic plan sectional view in which a state, in which a vehicle occupant is restrained by the side airbag relating to the first embodiment, is viewed from a vehicle upper side.
Figure 7B:
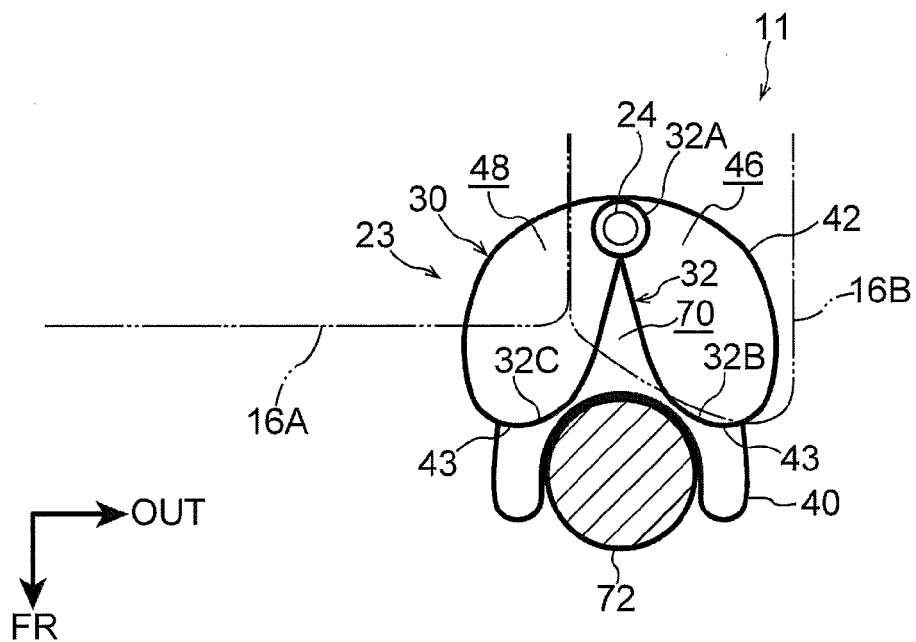
FIG. 7B is a schematic plan sectional view in which a situation, at the time when the side airbag relating to the first embodiment inflates and expands in a state in which there is cargo at the front of a side support portion, is viewed from the vehicle upper side.

On the other hand, in the present embodiment, as described above, it can be made such that the internal pressure P1 of the rear bag portion 42 does not inadvertently decrease, and therefore, it can be made such that a drop in the reaction force F does not occur (refer to the solid line of FIG. 6C). As a result, the vehicle occupant restraining performance of the side airbag 23 can be improved effectively.

Further, in the present embodiment, when inflation and expansion of the left and right chambers 46, 48 of the rear bag portion 42 are completed and the inflator 24 finishes generating gas, the flow regulating portion 32A is crushed by the internal pressures of the left and right chambers 46, 48. Due thereto, the gap between the inner peripheral surface of the flow regulating portion 32A and the outer peripheral surface of the inflator 24 can be closed. As a result, the flow of gas between the interior of the lower bag portion 110 and the interior of the rear bag portion 42 can be cut-off. Further, the region that is further toward the upper side and the region that is further toward the lower side than the inflator 24 at the flow regulating portion 32A are crushed by the internal pressures of the left and right chambers 46, 48. Due thereto as well, the flow of gas between the interior of the lower bag portion 110 and the interior of the rear bag portion 42 can be cut-off, and therefore, a check valve for cutting-off such flow of gas is not needed. As a result, even in the structure in which the lower bag portion 110 is provided at the bag body 30, simplification and compactness of the structure can be devised.

Moreover, in the state in which inflation and expansion of the front bag portion 40, the rear bag portion 42 and the lower bag portion 110 have been completed, flows of gas between the respective bag portions are cut-off, and the respective bag portions are respectively independent. Accordingly, the internal pressures of the respective bag portions can be adjusted individually by, for example, forming a vent hole in each of or in some of the respective bag portions (as an example, refer to vent hole VH shown by the imaginary line in FIG. 1). As a result, the vehicle occupant P can be restrained appropriately in accordance with the resistances of the respective regions of the body of the vehicle occupant P, and therefore, the vehicle occupant restraining ability by the side airbag 23 can be improved more effectively.

Figure 8A:
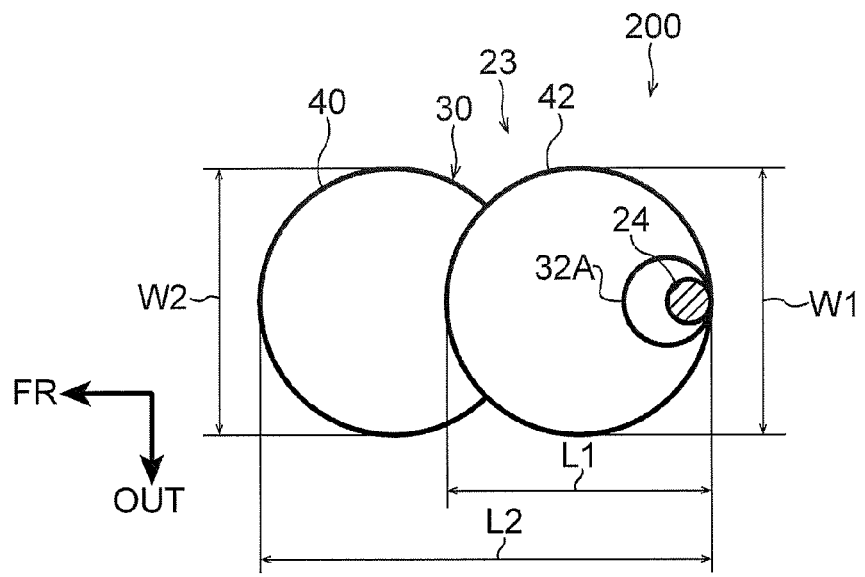
FIG. 8A is a schematic plan sectional view showing an inflated and expanded state of a side airbag relating to a comparative example.
Figure 8B:
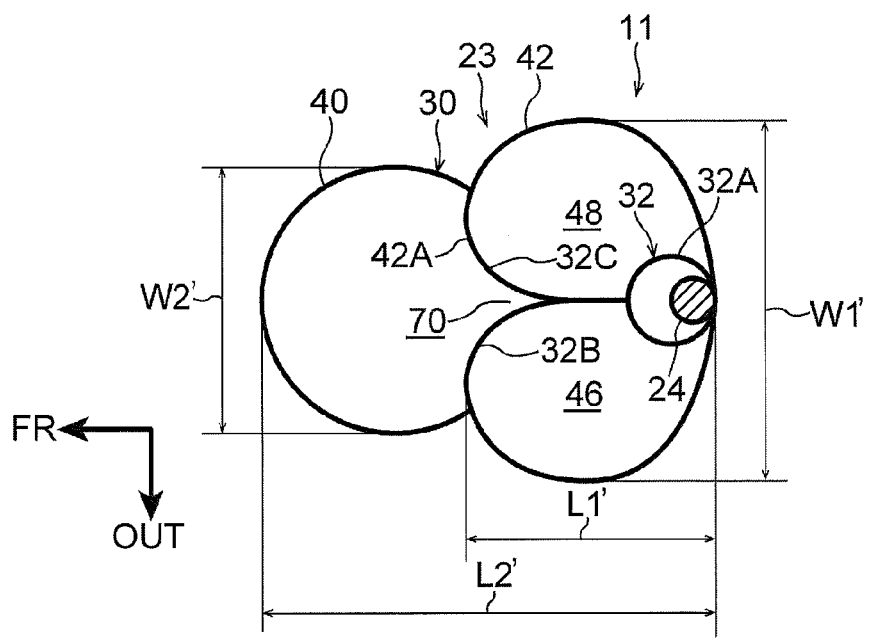
FIG. 8B is a schematic plan sectional view showing an inflated and expanded state of the side airbag relating to the first embodiment.

Moreover, in the present embodiment, the left and right chambers 46, 48 of the rear bag portion 42 respectively inflate and are lined-up in the vehicle transverse direction (the vehicle left-right direction). Therefore, the inflated thickness in the vehicle transverse direction of the rear bag portion 42 can be increased as compared with a case in which the rear bag portion 42 is structured by one chamber (refer to comparative example 200 shown in FIG. 8A). Namely, in FIG. 8A and FIG. 8B, in a case in which L1=L1' and L2=L2', it can be made such that W1<W1' (note that W2=W2' in FIG. 8A and FIG. 8B). This is because, in the present embodiment, as shown in FIG. 8B, the left and right chambers 46, 48 that are lined-up in the vehicle transverse direction respectively attempt to inflate in cylindrical shapes as seen in plan view. Due thereto, in the present embodiment, the inflated thickness in the vehicle transverse direction of the rear bag portion 42 can be increased, as compared with a case in which one chamber of the rear bag portion 42 inflates in a cylindrical shape as seen in plan view as in the comparative example 200.

In other words, the inflated thickness L1' in the vehicle front-rear direction of the rear bag portion 42 can be reduced while the inflated thickness W1' in the vehicle transverse direction of the rear bag portion 42 is ensured. Due thereto, effects of the rear bag portion 42 on a vehicle occupant who is in an improper position can be suppressed more effectively, while the vehicle occupant restraining performance by the rear bag portion 42 is ensured.

Figure 9A:
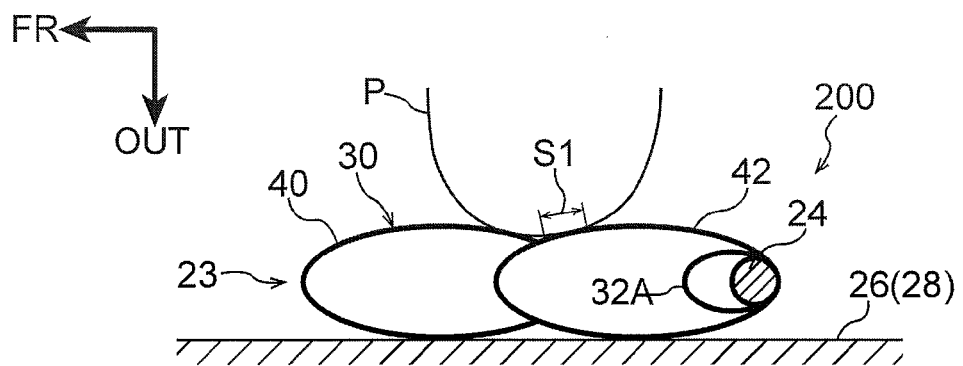
FIG. 9A is a schematic plan sectional view showing a state in which the side airbag relating to the comparative example is crushed between the vehicle occupant and a door trim.
Figure 9B:
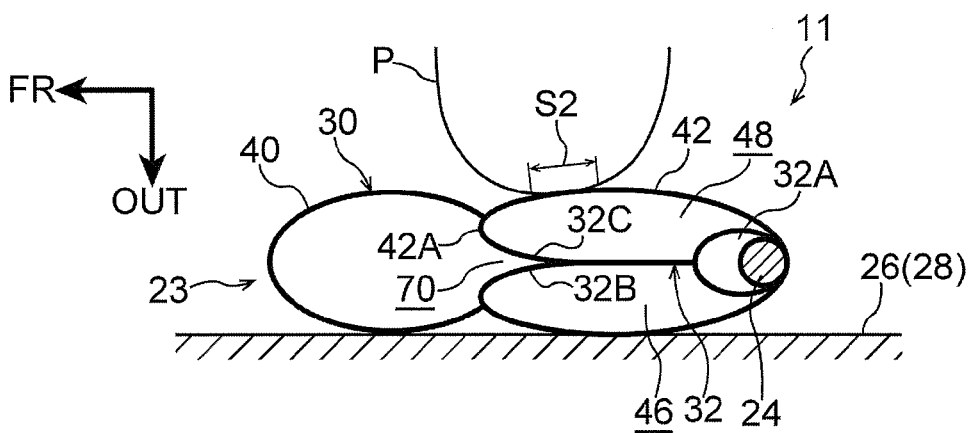
FIG. 9B is a schematic plan sectional view showing a state in which the side airbag relating to the first embodiment is crushed between the vehicle occupant and the door trim.

Further, in the present embodiment, because the inflated thickness of the rear bag portion 42 can be made to be thick, the surface area of contact between the rear bag portion 42 and the vehicle occupant P can be increased. Namely, in the present embodiment that is shown in FIG. 9B, the amount of crushing at the time when the rear bag portion 42 is crushed between the vehicle occupant P and the door trim 28 is larger than in the comparative example 200 shown in FIG. 9A (the same structure as FIG. 8A). As a result, in the present embodiment, the border between the rear bag portion 42 and the front bag portion 40 is displaced further toward the vehicle front side than in the comparative example 200, and therefore, the surface area of contact between the rear bag portion 42 and the vehicle occupant P can be increased (S1<S2 in FIG. 9A and FIG. 9B). Due thereto, the vehicle occupant P can be restrained more effectively by the rear bag portion 42.

Further, in the present embodiment, because the flow regulating portion 32A, that regulates the flow of gas from the inflator 24, is structured by a portion of the front-rear partitioning cloth 32, the structure can be simplified. Further, the front-rear partitioning cloth 32 that includes the flow regulating portion 32A can be made so as to not become bulky, and therefore, the side airbag 23 can be folded-up compactly. Due thereto, the ability to install the side airbag device 11 into the side support portion 16B can be improved.

Moreover, in the present embodiment, the front extension portion 42B that restrains the shoulder portion S of the vehicle occupant P is provided at the upper portion of the rear bag portion 42. Due to this front extension portion 42B inflating and expanding at an early stage, the shoulder portion S of the vehicle occupant P can be restrained at an early stage. Moreover, this front extension portion 42B is divided from the front bag portion 40 along the inclined portions 43B that extend from the upper ends of the vertically extending portions 43A toward an obliquely upper front side of the seatback 16, and inflates and expands toward the upper side of the front bag portion 40. Due to the front extension portion 42B being set in this way, the front extension portion 42B, i.e., the upper portion of the high-pressure rear bag portion 42, can be made to face well the shoulder portion S of the vehicle occupant P, while an increase in the volume of the rear bag portion 42 is suppressed.

Moreover, the vehicle transverse direction inner side surface of the front bag portion 40 that has inflated and expanded curves such that the portion thereof further toward the upper side than the vertical direction central portion thereof rises upward while heading toward the vehicle transverse direction outer side. Therefore, due to the side airbag 23 and the vehicle occupant P relatively approaching one another due to the impact of a side collision, the aforementioned curved surface and the upper arm portion A of the vehicle occupant P slidingly contact, and force that pushes the upper arm portion A upward is generated. As a result, the upper arm portion A is pushed upward toward above the front bag portion 40, and is restrained by the front extension portion 42B. Due thereto, the upper arm portion A becoming interposed between the chest region C of the vehicle occupant P and the side airbag 23 can be suppressed, and therefore, the load on the chest region C can be reduced.

Moreover, because the width dimensions of the left side partitioning portion 32B and the right side partitioning portion 32C decrease at the forwardly extending portions 32B1, 32C1, the upper portion of the vehicle transverse direction inner side surface of the front bag portion 40 can be curved greatly. Due thereto, the pushing-up force that is applied to the upper arm portion A can be increased.

Moreover, as described above, the above-described front extension portion 42B extends from the side of the shoulder portion S of the vehicle occupant P toward the vehicle front side, and is disposed above the front bag portion 40. Therefore, for example, even in a case in which the form of the side collision is a so-called oblique side collision and the vehicle occupant P inertially moves toward a vehicle obliquely front side, it can be made such that the shoulder portion S of the vehicle occupant P does not come away from the front extension portion 42B. Due thereto, regardless of the form of the side collision, the shoulder portion S of the vehicle occupant P can be restrained well by the side airbag 23, and the restraining of the shoulder portion S can be continued until the latter half of the collision.

Further, in the present embodiment, when viewing the inflated and expanded state of the side airbag 23 from the vehicle transverse direction, the top-bottom partitioning cloth 150 is set so as to be inclined forwardly downward with respect to the front-rear direction of the seatback 16 (the direction along arrow X of FIG. 1). Due thereto, there is a structure in which the inflated thickness in the vehicle vertical direction at the lower bag portion 110 that has inflated and expanded becomes smaller the further toward the vehicle front side. Therefore, even if the side airbag 23 were to inflate and expand in a state in which a vehicle occupant or cargo or the like were positioned in front of the lower portion of the side support portion 16B, effects of the lower bag portion 110 on the vehicle occupant or the cargo or the like could be reduced.

Further, in the present embodiment, gas generated from the inflator 24 is supplied from the upper end opening 154 of the flow regulating portion 32A to the upper portion of the interior of the rear bag portion 42, and is supplied from the lower end opening 156 of the flow regulating portion 32A to the interior of the lower bag portion 110. Due thereto, the upper portion of the rear bag portion 42 and the lower bag portion 110 can be inflated and expanded at an early stage, and therefore, of the body of the vehicle occupant P, the shoulder portion S and lumbar region L that have relatively higher load resistance than the chest region C and the abdominal region B can be restrained at an early stage.

Further, in the present embodiment, the region 151 that is not partitioned into the left and right chambers 46, 48 is provided at the upper portion of the rear bag portion 42, and gas is distributed through this region 151 to the left and right chambers 46, 48. Due thereto, gas can be distributed well to the left and right chambers 46, 48, and the left and right chambers 46, 48 can be inflated and expanded in a well-balanced manner.

Other embodiments of the present invention are described next. Note that structures/operation that are basically similar to those of the above-described first embodiment are denoted by the same reference numerals as in the above-described first embodiment, and description thereof is omitted.

<Second Embodiment>

Figure 10:
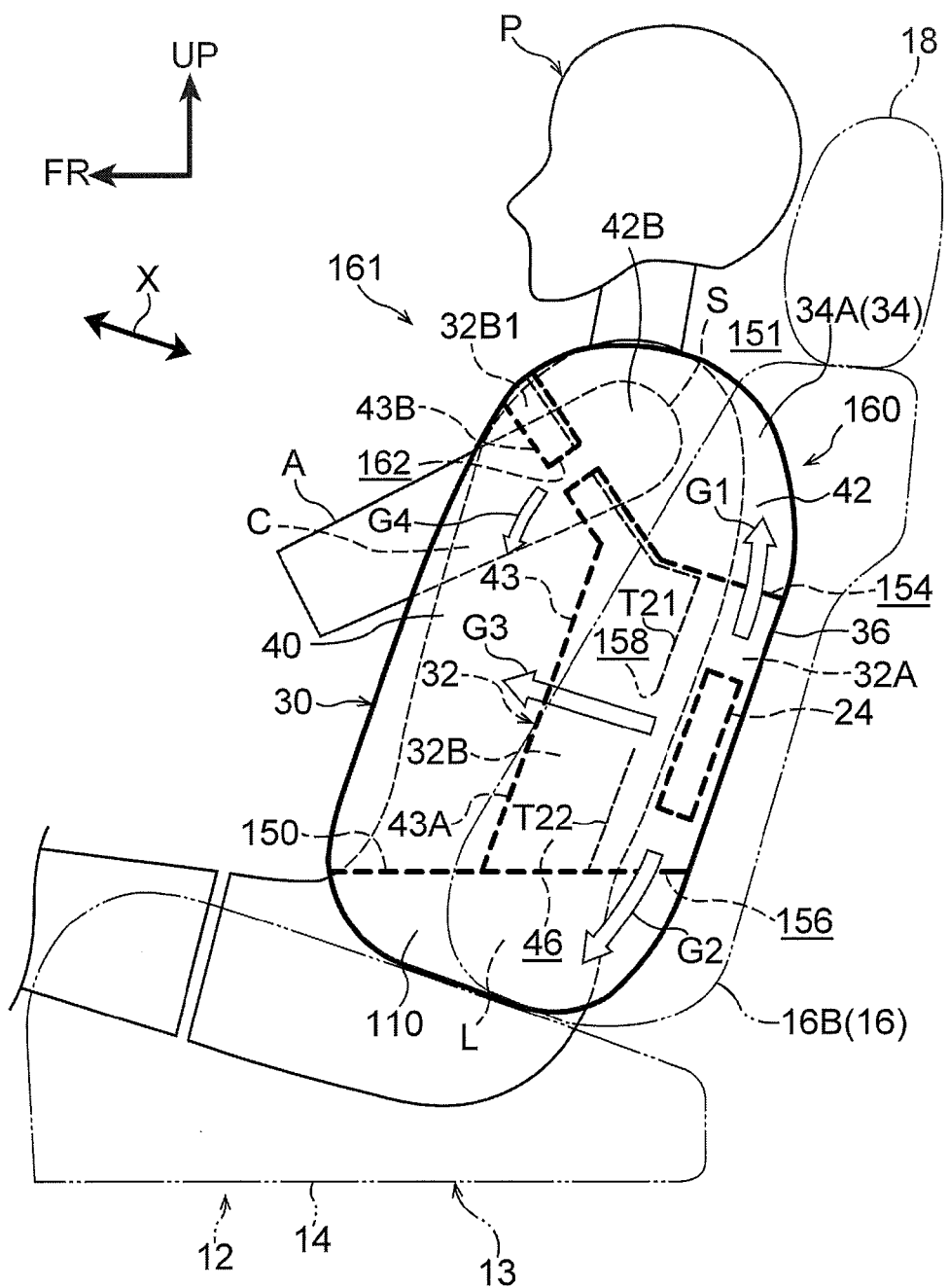
FIG. 10 is a side view that corresponds to FIG. 1 and shows a state of completion of inflation and expansion of a side airbag that a vehicle side airbag device relating to a second embodiment of the present invention has.

A state in which inflation and expansion of a side airbag 160, that a vehicle side airbag device 161 relating to a second embodiment of the present invention has, are completed is shown in FIG. 10 in a side view that corresponds to FIG. 1. In this embodiment, the interior of the front bag portion 40 and the interior of the rear bag portion 42 are communicated via an additional communication opening 162 (inner vent hole) that is formed at the forwardly extending portion 32B1 and the forwardly extending portion 32C1 (not illustrated in FIG. 10) of the front-rear partitioning cloth 32. Structures other than that described above are similar to those of the above-described first embodiment.

In this embodiment, gas that is supplied from the inflator 24 to the interior of the rear bag portion 42 can be supplied via the additional communication opening 162 to the interior of the front bag portion 40 (refer to arrow G4 of FIG. 10). Due thereto, because the inflation and expansion completion times of the front bag portion 40 and the rear bag portion 42 can be offset intentionally, the inflation and expansion completion times of the front bag portion 40 and the rear bag portion 42 can be optimized (fine-tuned) in accordance with, for example, differences in types of vehicles or the like. Note that the region where the additional communication opening 162 is formed is not limited to that described above, and there may be a structure in which an additional communication opening is formed at a portion at the vertically extending portions 43A side of the front-rear partitioning cloth 32.

<Third Embodiment>

Figure 11:
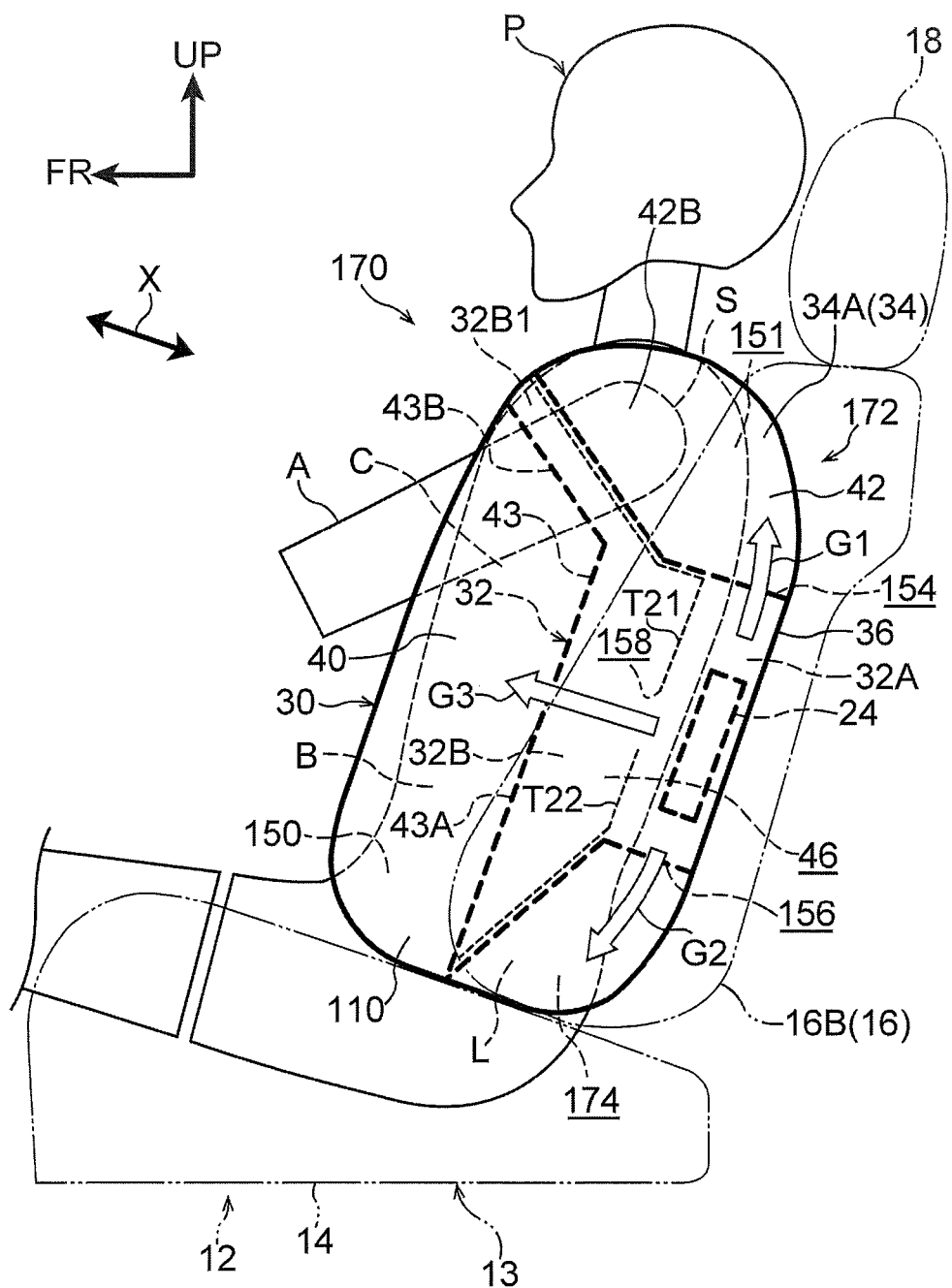
FIG. 11 is a side view that corresponds to FIG. 1 and shows a state of completion of inflation and expansion of a side airbag that a vehicle side airbag device relating to a third embodiment of the present invention has.

A state in which inflation and expansion of a side airbag 172, that a vehicle side airbag device 170 relating to a third embodiment of the present invention has, are completed is shown in FIG. 11 in a side view that corresponds to FIG. 1. In this side airbag 172, the top-bottom partitioning cloth 150 and the lower bag portion 110 of the above-described first embodiment are omitted, and the front bag portion 40 and the rear bag portion 42 extend to the lower end of the bag body 30.

Namely, in this side airbag 172, the lower end edges of the left side partitioning portion 32B and the right side partitioning portion 32C of the front-rear partitioning cloth 32 extend obliquely forward and downward from the front end portion of the lower end portion of the flow regulating portion 32A toward a front-rear direction intermediate portion of the lower end portion of the bag body 30, and are sewn by sewn portion T22. Further, the lower portion of the bag body 30 is partitioned into the front bag portion 40 and the rear bag portion 42 by this front-rear partitioning cloth 32. At this front-rear partitioning cloth 32, the dimensions in the vertical direction of the left side partitioning portion 32B and the right side partitioning portion 32C become larger the further toward the front end edge portion sides where the one side portion 34A and the other side portion 34B of the base cloth 34 of the bag body 30 are sewn.

Regions 151, 174 that are not partitioned into the left and right chambers 46, 48 are provided respectively at the upper portion and the lower portion of the rear bag portion 42. The upper end opening 154 and the lower end opening 156 of the flow regulating portion 32A open at these regions 151, 174. Further, the left and right chambers 46, 48 and the interior of the flow regulating portion 32A are communicated via the upper end opening 154 and the lower end opening 156 and the above-described regions 151, 174.

In this embodiment, structures other than those described above are similar to those of the above-described first embodiment, and therefore, operation and effects that are similar to those of the above-described first embodiment can be obtained other than the operation and effects that are obtained due to the provision of the lower bag portion 110. Further, in this embodiment, at the time when the inflator 24 operates, gas generated from the inflator 24 is supplied from the upper end opening 154 and the lower end opening 156 of the flow regulating portion 32A to the upper portion and the lower portion of the rear bag portion 42. Due thereto, the upper portion and the lower portion of the rear bag portion 42 can be inflated and expanded at an early stage, and therefore, the rear portions of the shoulder portion S and the lumbar region L of the vehicle occupant P can be restrained at an early stage.

Moreover, in this present embodiment, the regions 151, 174 that are not partitioned into the left and right chambers 46, 48 are provided at the upper portion and the lower portion of the rear bag portion 42, and gas is distributed to the left and right chambers 46, 48 through these regions 151, 174. Due thereto, gas can be distributed well to the left and right chambers 46, 48, and therefore, the left and right chambers 46, 48 can be inflated and expanded in a well-balanced manner.

<Fourth Embodiment>

Figure 12:
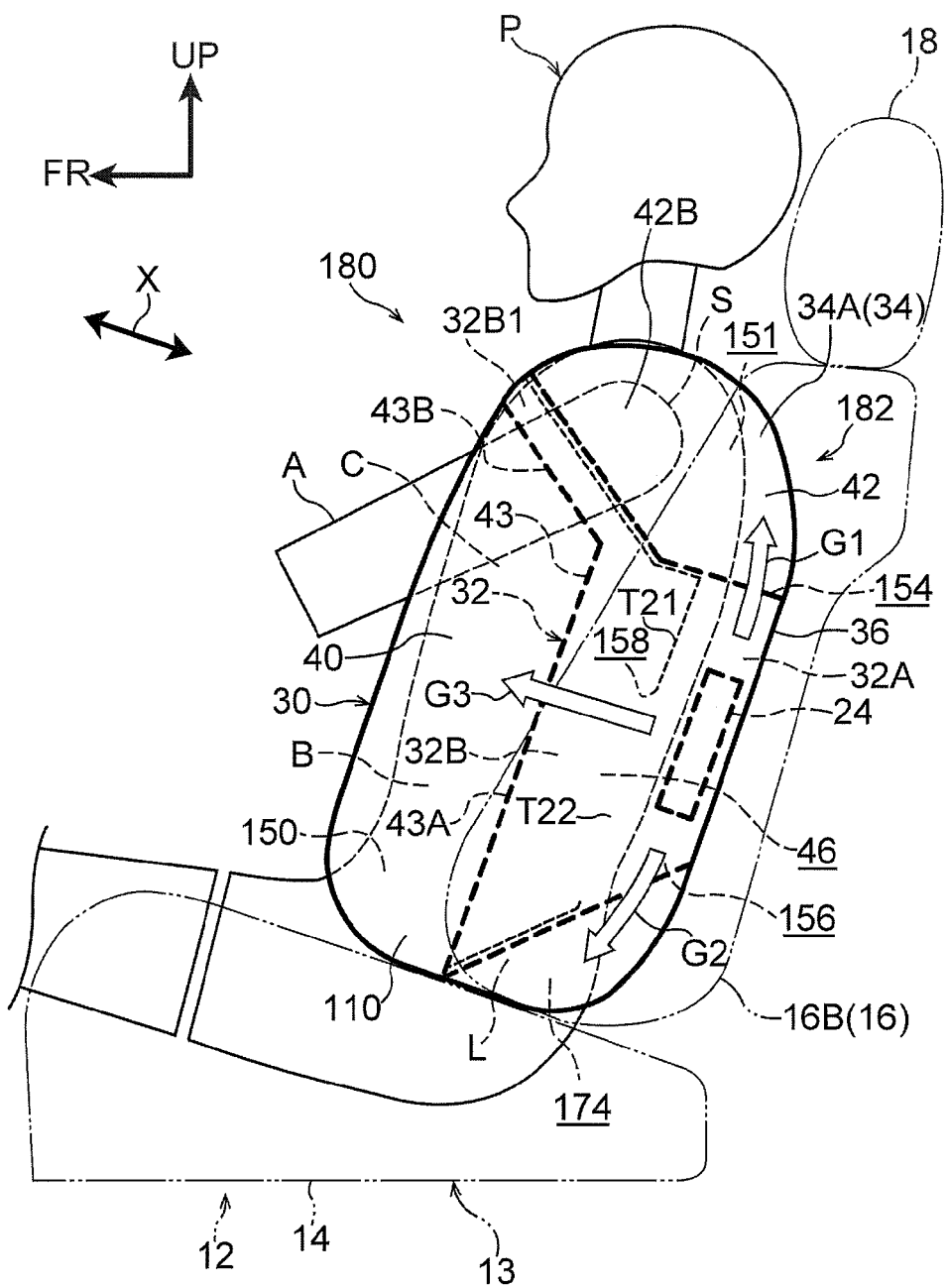
FIG. 12 is a side view that corresponds to FIG. 1 and shows a state of completion of inflation and expansion of a side airbag that a vehicle side airbag device relating to a fourth embodiment of the present invention has.

A state in which inflation and expansion of a side airbag 182, that a vehicle side airbag device 180 relating to a fourth embodiment of the present invention has, are completed is shown in FIG. 12 in a side view that corresponds to FIG. 1. In this side airbag 182, the lower end edges of the left side partitioning portion 32B, the right side partitioning portion 32C and the flow regulating portion 32A, i.e., the entire lower end edge of front-rear partitioning cloth 32, extends from the rear end portion of the lower end portion of the flow regulating portion 32A, obliquely forward and downward toward a front-rear direction intermediate portion of the lower end portion of the bag body 30. Structures other than these are similar to those of the side airbag 172 relating to the above-described third embodiment. In this embodiment as well, operation and effects that are similar to those of the above-described third embodiment can be obtained.

<Fifth Embodiment>

Figure 13:
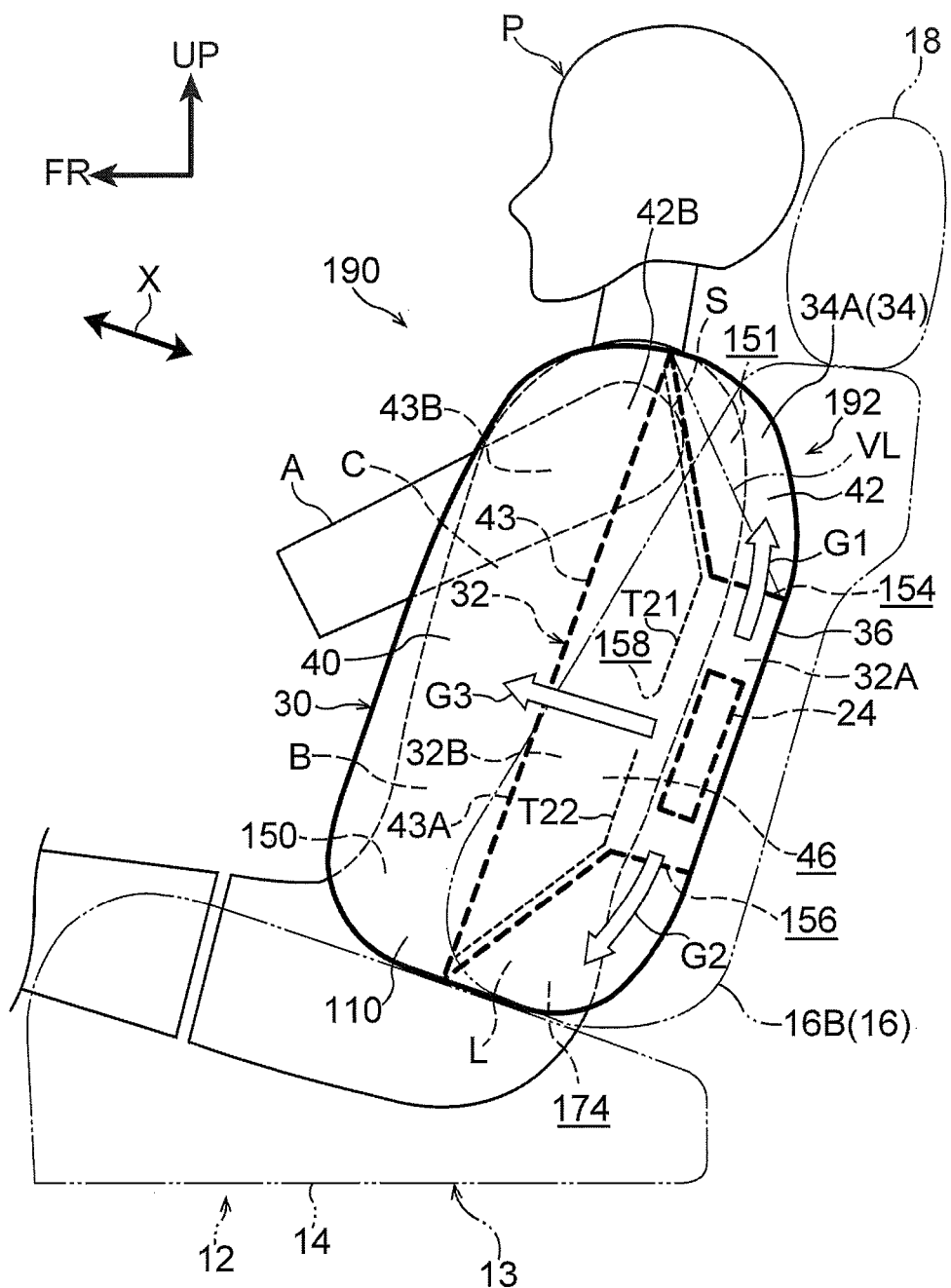
FIG. 13 is a side view that corresponds to FIG. 1 and shows a state of completion of inflation and expansion of a side airbag that a vehicle side airbag device relating to a fifth embodiment of the present invention has.

A state in which inflation and expansion of a side airbag 192, that a vehicle side airbag device 190 relating to a fifth embodiment of the present invention has, are completed is shown in FIG. 13 in a side view that corresponds to FIG. 1. In this side airbag 192, the front extension portion 42B relating to the above-described first through fourth embodiments is omitted, but structures other than this are similar to those of the side airbag 172 relating to the above-described third embodiment.

At this side airbag device 192, the upper end edges of the left side partitioning portion 32B and the right side partitioning portion 32C of the front-rear partitioning cloth 32 extend from the front end portion of the upper end portion of the flow regulating portion 32A, obliquely forward and upward toward a front-rear direction intermediate portion at the upper end portion of the bag body 30, and are sewn by the sewn portion T21. Further, the upper portion of the bag body 30 is partitioned by this front-rear partitioning cloth 32 into the front bag portion 40 and the rear bag portion 42. At this front-rear partitioning cloth 32, the dimensions in the vertical direction of the left side partitioning portion 32B and the right side partitioning portion 32C become larger the further toward the front end edge portion sides where the one side portion 34A and the other side portion 34B of the base cloth 34 of the bag body 30 are sewn.

In this embodiment, operation and effects that are similar to those of the above-described third embodiment can be obtained with regard to points other than the operation and effects obtained by the providing of the front extension portion 42B. Further, in the present embodiment, because the front extension portion 42B is omitted, the vehicle occupant who is at an improper position being affected by the rear bag portion 42 can be prevented or suppressed more effectively.

<Sixth Embodiment>

Figure 14:
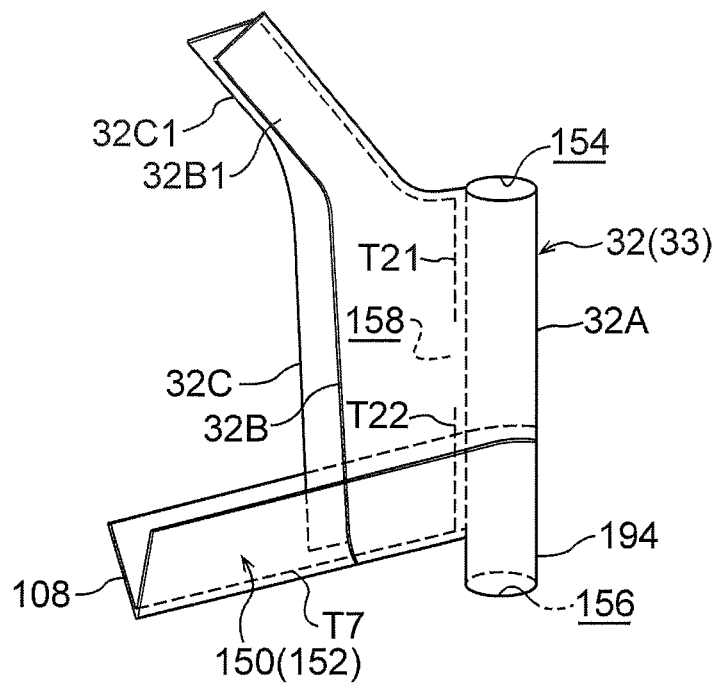
FIG. 14 is a perspective view of the front-rear partitioning cloth and the top-bottom partitioning cloth that are structural members of a side airbag that a vehicle side airbag device relating to a sixth embodiment of the present invention has.

The front-rear partitioning cloth 32 and the top-bottom partitioning cloth 150, that a side airbag of a vehicle side airbag device relating to a sixth embodiment of the present invention has, are shown in a perspective view in FIG. 14. In this embodiment, the lower end portion of the flow regulating portion 32A of the front-rear partitioning cloth 32 extends toward the lower side. Due thereto, a check valve 194, that limits the flow of gas from the interior of the lower bag portion 110 to the interior of the rear bag portion 42, is formed at the lower end portion of the flow regulating portion 32A. Structures other than this are similar to those of the above-described first embodiment.

In this embodiment, at the time when inflation and expansion of the front bag portion 40, the rear bag portion 42 and the lower bag portion 110 are completed, in addition to the flow regulating portion 32A being crushed by the internal pressure of the rear bag portion 42, the check valve 194 is crushed by the internal pressure of the lower bag portion 110. Due thereto, the flow of gas between the lower bag portion 110 and the rear bag portion 42 can be cut-off more reliably than in the above-described first embodiment.

<Seventh Embodiment>

Figure 15:
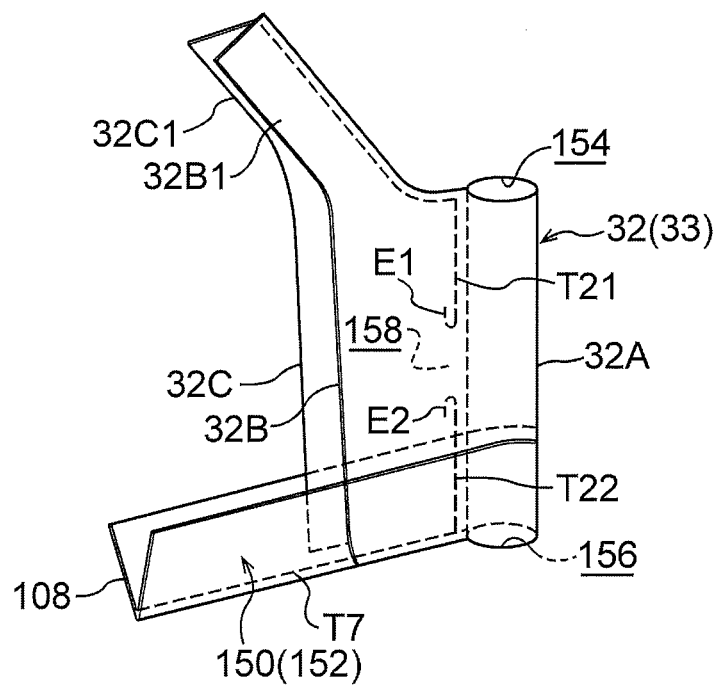
FIG. 15 is a perspective view of the front-rear partitioning cloth and the top-bottom partitioning cloth that are structural members of a side airbag that a vehicle side airbag device relating to a seventh embodiment of the present invention has.

The front-rear partitioning cloth 32 and the top-bottom partitioning cloth 150, that a side airbag of a side airbag device relating to a seventh embodiment of the present invention has, are shown in a perspective view in FIG. 15. In this embodiment, final end sewing processed portions E1, E2 are provided due to final end sewing processing being carried out respectively on the lower end portion of the sewn portion T21 and the upper end portion of the sewn portion T22. At the final end sewing processed portion E1, the lower end portion of the sewn portion T21 is sewn back in a U-shape toward the upper side of the bag body 30 (not shown in FIG. 16), and, at the final end sewing processed portion E2, the upper end portion of the sewn portion T22 is sewn back in a U-shape toward the lower side of the bag body 30. Structures other than those described above are similar to those of the above-described first embodiment.

Figure 16:
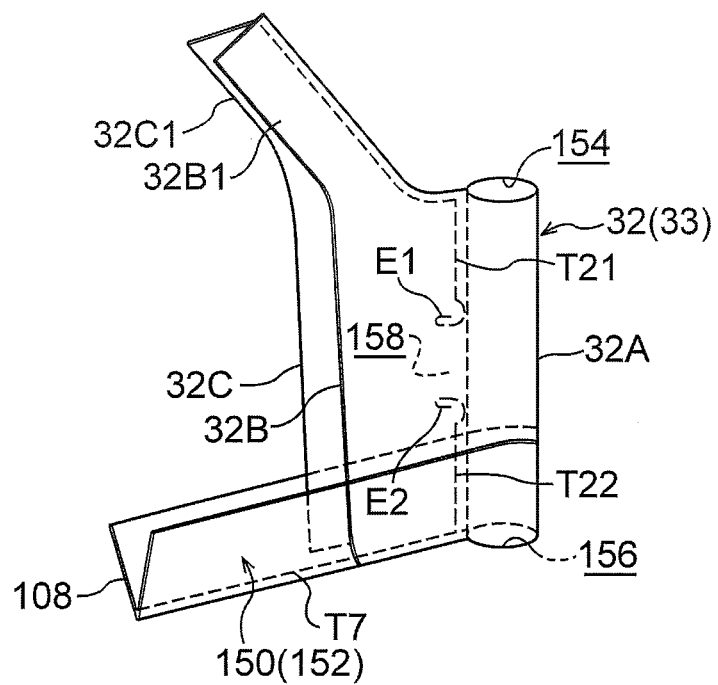
FIG. 16 is a perspective view that corresponds to FIG. 15 and is for explaining a modified example of final end sewing processing relating to the seventh embodiment.

In this embodiment, the lower end portion of the sewn portion T21 and the upper end portion of the sewn portion T22 breaking due to the gas (refer to arrow G3 of FIG. 1) that is supplied into the front bag portion 40 from the communication opening 158 that is between the lower end portion of the sewn portion T21 and the upper end portion of the sewn portion T22, can be prevented or suppressed by the final end sewing processed portions E1, E2. Note that, as shown in FIG. 16, the lower end portion of the sewn portion T21 and the upper end portion of the sewn portion T22 may be sewn in circular arc shapes such that the final end sewing processed portions E1, E2 protrude-out toward the side opposite the flow regulating portion 32A. Due thereto, breakage such as described above can be prevented or suppressed more effectively.

<Supplementary Explanation of Embodiments>

In the above-described respective embodiments, the bag body 30, the front-rear partitioning cloth 32 that serves as the front-rear partitioning portion, and the top-bottom partitioning cloth 150 that serves as a top-bottom partitioning portion are structured so as to be made of cloth, but the present invention is not limited to this. For example, there may be a structure in which the bag body, the front-rear partitioning portion and the top-bottom partitioning portion are manufactured of a material that is sheet-shaped and is flexible.

Further, in the above-described respective embodiments, the left and right chambers 46, 48 of the rear bag portion 42 may be formed so as to be left-right asymmetric. In the case of such a structure, at the time of folding-up the side airbag 23, it can be made such that the sewn portions T5, T6 and the like do not overlap, and therefore, the side airbag 23 can be folded-up compactly.

Further, in the above-described respective embodiments, the left side partitioning portion 32B and the right side partitioning portion 32C, and the flow regulating portion 32A of the front-rear partitioning cloth 32 (the front-rear partitioning portion) are structured so as to be provided integrally. However, the present invention is not limited to this. For example, the left side partitioning portion, the right side partitioning portion, and the flow regulating portion may respectively be formed by separate cloth materials, and may be structured so as to be sewn together.

In addition, the present invention can be implemented by being changed in various ways within a scope that does not depart from the gist thereof. Further, the scope of the right of the present invention is, of course, not limited to the above-described respective embodiments.

The disclosure of Patent Application No. 2013-202261 that is a Japanese application is, in its entirety, incorporated by reference into the present specification. Further, all publications, patent applications, and technical standards mentioned in the present specification are incorporated by reference into the present specification to the same extent as if such individual publication, patent application, or technical standard was specifically and individually indicated to be incorporated by reference.

DESCRIPTION OF REFERENCE NUMERALS

11 vehicle side airbag device
12 vehicle seat
13 seat main body
14 seat cushion
16 seat back
16B side support portion
23 side airbag
24 inflator
30 bag body
32 front-rear partitioning cloth (front-rear partitioning portion)
32A flow regulating portion
32B left side partitioning portion
32C right side partitioning portion
40 front bag portion
42 rear bag portion
46, 48 left and right chambers
110 lower bag portion
150 top-bottom partitioning cloth (top-bottom partitioning portion)
151 non-partitioned region of upper portion of rear bag portion
154 upper end opening
156 lower end opening
158 communication opening
160 side airbag
161 vehicle side airbag device
170 vehicle side airbag device
172 side airbag
174 non-partitioned region of lower portion of rear bag portion
180 vehicle side airbag device
182 side airbag
190 vehicle side airbag device
192 side airbag
194 check valve

The invention claimed is:

1. A vehicle side airbag device comprising:
a bag body that is formed in a shape of a bag, that, in a folded-up state, is accommodated within a side support portion of a seat back of a vehicle seat, and that inflates and expands toward a vehicle front side of the side support portion due to gas being supplied to an interior of the bag body;
a tubular flow regulating portion that is provided at a rear end portion of the interior of the bag body;
a front-rear partitioning portion that partitions the bag body into a front bag portion and a rear bag portion, and that partitions the rear bag portion into a left chamber and a right chamber, and that communicates the left and right chambers with an interior of the flow regulating portion, the front-rear partitioning portion including a left side partitioning portion and a right side partitioning portion that extend from the flow regulating portion, a front end edge portion of the left side partitioning portion being sewn to a front-rear direction intermediate portion of a left side portion of the bag body, and a front end edge portion of the right side partitioning portion being sewn to a front-rear direction intermediate portion of a right side portion of the bag body;
an inflator that is provided within the flow regulating portion, and that generates the gas that is supplied to the interior of the bag body; and
a communication opening that is provided at a vertical direction intermediate portion of the flow regulating portion, that passes-through between the left side partitioning portion and the right side partitioning portion, and that communicates the interior of the flow regulating portion and an interior of the front bag portion.

2. The vehicle side airbag device of claim 1, wherein a first portion of a border portion between the flow regulating portion and the left and right side partitioning portions is sewn together, and the communication opening is formed at a second portion of the border portion at which the flow regulating portion and the left and right side partitioning portions are not sewn together.

3. The vehicle side airbag device of claim 1, wherein the vehicle side airbag device is structured such that inflation and expansion of the front bag portion and the rear bag portion are completed before the inflator finishes generating the gas.

4. The vehicle side airbag device of claim 1, further comprising a top-bottom partitioning portion that further partitions the bag body into a lower bag portion, and the interior of the flow regulating portion and an interior of the lower bag portion communicate via a lower end opening of the flow regulating portion.

5. The vehicle side airbag device of claim 4, wherein a check valve, that limits flow of the gas from the lower bag portion to the rear bag portion, is provided at a lower end portion of the flow regulating portion.

6. The vehicle side airbag device of claim 1, wherein an upper portion of the rear bag portion is not partitioned into the left and right chambers, and an upper end opening of the flow regulating portion opens at a non-partitioned region at which the upper portion of the rear bag portion is not partitioned, and the left and right chambers and the interior of the flow regulating portion communicate via the upper end opening.

7. The vehicle side airbag device of claim 4, wherein a vent hole is formed in each of or in some of the front bag portion, the rear bag portion, and the lower bag portion.

8. The vehicle side airbag device of claim 1, wherein the left and right chambers are formed so as to be left-right asymmetric.

9. The vehicle side airbag device of claim 1, wherein an additional communication opening, that communicates the interior of the front bag portion and an interior of the rear bag portion, is formed at the front-rear partitioning portion.

10. The vehicle side airbag device of claim 1, wherein
the flow regulating portion is disposed at a vertical direction intermediate portion of the rear end portion of the interior of the bag body,
dimensions in a vertical direction of the left side partitioning portion and the right side partitioning portion become larger further toward the front end edge portions that are sewn to the bag body,
regions that are not partitioned into the left and right chambers are provided respectively at an upper portion and a lower portion of the rear bag portion, and an upper end opening and a lower end opening of the flow regulating portion open at the regions, and
the left and right chambers and the interior of the flow regulating portion communicate via the upper end opening and the lower end opening.

11. The vehicle side airbag device of claim 1, wherein
portions, that are further toward an upper end side than the flow regulating portion, of the left side partitioning portion and the right side partitioning portion are configured to be forwardly extending portions that are tilted obliquely toward a side opposite the flow regulating portion, and
a front extension portion, that is disposed above the front bag portion in inflated and expanded state, is provided at an upper portion of the rear bag portion.

12. A vehicle seat comprising:
a seat main body having a seat cushion and a seat back; and
the vehicle side airbag device of claim 1 that is provided at the seat back.

* * * * *